United States Patent
Fisher et al.

(10) Patent No.: US 6,247,128 B1
(45) Date of Patent: *Jun. 12, 2001

(54) COMPUTER MANUFACTURING WITH SMART CONFIGURATION METHODS

(75) Inventors: Jerald C. Fisher, Tomball; Lien Dai Nguyen; James Young, both of Houston; Gunnar P. Seaburg, Woodlands; Galen W. Hedlund, Tomball; Richard S. Katz, Spring, all of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,431

(22) Filed: Apr. 30, 1998

Related U.S. Application Data

(60) Provisional application No. 60/053,455, filed on Jul. 22, 1997.

(51) Int. Cl.[7] .............................. G06F 13/00; G06F 9/445
(52) U.S. Cl. .............................. 713/100; 713/201; 713/1; 717/11
(58) Field of Search .............................. 713/1, 100, 700, 713/200, 2, 106

(56) References Cited

U.S. PATENT DOCUMENTS

| | | | | |
|---|---|---|---|---|
| 5,432,941 | * | 7/1995 | Crick | 395/700 |
| 5,630,076 | * | 5/1997 | Saulpaugh | 395/284 |
| 5,675,748 | * | 10/1997 | Ross | 395/284 |
| 5,894,571 | * | 4/1999 | O'Conner | 395/652 |
| 5,963,743 | * | 10/1999 | Amberg | 395/712 |

OTHER PUBLICATIONS

Bournellis, Cynthia and McAleer, Bernard, "Build–to–Order Program Is Launched by Compaq", Electronic Times, Jul. 14, 1997, 2 pages.

Wall Street Journal, Jul. 10, 1997, Compaq advertisement, 8 pages.

* cited by examiner

*Primary Examiner*—Reba I. Elmore
(74) *Attorney, Agent, or Firm*—Conley, Rose & Tayon, P.C.

(57) ABSTRACT

A system of computer manufacturing with pre-installation of software which utilizes a software selection process controlled by a rules database to determine the proper software components to be pre-installed onto an assembled computer or hard drive. Additionally, the rules base determines the appropriate diagnostic and set-up software components to be installed in order to ensure a system that is ready-to-run upon receipt by a purchaser.

48 Claims, 19 Drawing Sheets

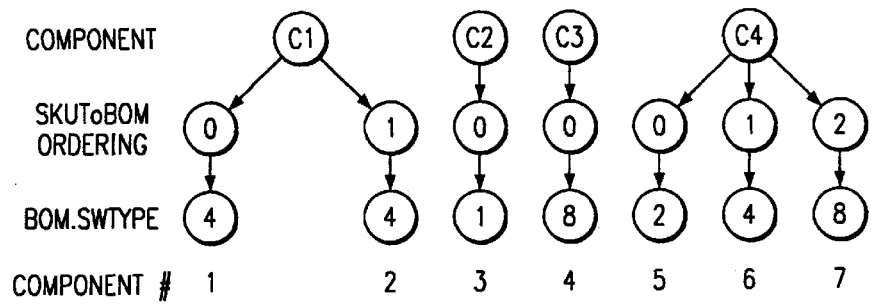
FIG. 7C
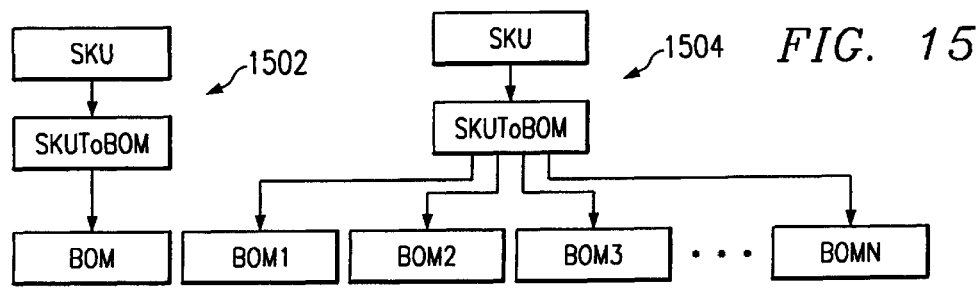
FIG. 14
FIG. 15

COMPUTER MANUFACTURING WITH SMART CONFIGURATION METHODS

CROSS-REFERENCE TO RELATED APPLICATION

This application claims priority from Provisional Application No. 60/053,455 filed Jul. 22, 1997, which is hereby incorporated by reference. However, the content of the present application is not necessarily identical to that of the priority application.

BACKGROUND AND SUMMARY OF THE INVENTION

The present application relates to computer manufacturing, and particularly to a smart component selection process which selects the correct software and diagnostic routines for a given hardware and software configuration.

Background: Software Installation

Software installation is normally a burden with new computers, and is often a source of frustration for consumers. Thus, pre-installation of software by the computer manufacturer is very welcome to consumers. Pre-installation also helps to avoid problems which might be caused by software incompatibilities or incorrect installation of software. Pre-installation of software also helps to avoid unnecessary service calls to the computer manufacturer which may be due to the consumer's difficulty in understanding the software installation instructions.

Software Management

Pre-installation of software to prevent incompatibilities or incorrect installation at the consumer level requires careful software management. This management takes place not only prior to but also during the manufacturing process.

Traditionally, pre-installation is accomplished through creation of disk images. A disk image is a file that holds a copy of all of the data, including partitioning and driver information, contained on a given storage medium (usually a hard disk drive). Disk images are usually prepared by a software engineering group once a personal computer has been configured with all of the appropriate components (operating system, applications, utilities, TSRs, etc.). This configured computer is referred to as a "master". The disk images themselves are then replicated and distributed to remote manufacturing sites for installation on consumer machines.

Configuration and installation takes place prior to packing the unit for shipping in order to provide the consumer with a unit that is operable ("ready to run") upon receipt. Configuration of the unit encompasses partitioning the unit's hard drive, setting up boot information, and adding file directory structure information. Installation is the process of writing the physical software files to the hard drive.

Background: Zip Deliverables

The role of a software distribution system is to facilitate the transfer of software, which is to be released to the consumer, to the manufacturing site. Once at the manufacturing site, the software will be installed and configured on a raw (unformatted) hard drive or the hard drive of a newly assembled personal computer.

Current distribution techniques depend on a batch delivery system. The batch is composed of a disk image (namely, the set of files released for installation consisting of all required components) which has been compressed into a single deliverable unit. Compression is a process by which the disk image is condensed in order to take up less storage space. Such a unit is often referred to as a "zip deliverable", which is a reference to the compression utility, PKZIP™, most often used to create the compressed file deliverable.

Currently, zip deliverables are distributed in what is known as the drop method, that is, when any change is made to just one of the files constituting the zip deliverable, the entire deliverable must be rebuilt and redistributed (dropped) to the manufacturing site. Such a distribution method puts an even greater demand on transmission capabilities, since all rebuilt deliverables will need to be redistributed to the manufacturing facilities in a relatively short period of time. Without prompt updates, the manufacturer has to allocate greater resources to post-consumer fixes.

Background: Disk Image Disadvantages

The use of disk images for distribution of software has inherent disadvantages. First, the size of disk images needed to distribute complete system software configurations has grown almost exponentially in the past 10 years, from 30 megabytes to over 400 megabytes, due to the increased hard disk space requirements of more functional operating systems and feature-rich applications.

Consequently, the storage media for the disk image must meet ever increasing capacity demands and distribution costs continue to rise.

Second, disk images are limited to one configuration. Changes in disk image configuration can result from any difference in hardware and software combinations. For each change in configuration, no matter how slight, an entirely new disk image must be built, replicated, and distributed. Most installation configurations tend to have one or more files in common, such as the operating system or user applications. This results in many files being duplicated and distributed multiple times. Large amounts of hardware storage space are required to store these common files multiple times, once for each minor difference in configuration.

Third, disk images cannot be updated. Once a disk image is built, it cannot be modified. Components that comprise disk images may need to be changed because of a software bug fix or new revision. If a component is changed, each disk image incorporating that component must be rebuilt, replicated, and distributed.

Fourth, in addition to greater demands on storage space, the amount of time to distribute multiple disk images has greatly increased. With each different configuration, time must be taken to create its disk image. The disk image must then be distributed.

The increase in the size of the disk image, even if the distribution system is computer network based, has a corresponding effect on the disk image transmission time. As the number of different computer configurations grows, improved transmission capability in terms of both speed and accuracy is required. Both speed and accuracy factor into maintaining efficient distribution of software to computer manufacturing facilities. Minimizing distribution time for disk images can be critical when updates to components have occurred to fix software bugs: The faster the disk image can be propagated to the installation site, the fewer the number of computers released with faulty software.

Finally, zip deliverables have the inherent disadvantage of a lack of security. During the distribution process, the media which contain the software may not be within the control of the manufacturer. If the zip deliverables are distributed via a common carrier, they could be misplaced or stolen. Because the zip deliverable is merely a compressed version of a configured software install, there is some risk that it could be used by anyone with the proper hardware and software to install or upgrade software on their own machine or the machines of others. Further, there is some risk that an intercepted zip deliverable could be imperceptibly altered to remove or add data (including viruses) and then sent on to the remote manufacturing facility.

Remote manufacturing facilities are not necessarily under the control of the manufacturing headquarters. In fact, some remote manufacturing facilities may be responsible for the assembly and configuration of machines from many different computer manufacturers. The zip deliverables themselves may contain the proprietary software of a particular company. Therefore, security of pre-installation software configurations is important within the remote manufacturing facility. A further concern, even at the remote manufacturing facility, is that the zip deliverables, due to their small size and ready mobility, could become misappropriated.

Background: Computer Manufacturing Constraints

Mass-manufacturing of mid-market or high-end personal computers faces some difficult constraints: software must be released from a software engineering group and distributed to a computer manufacturing facility without alterations that would change the configuration for a particular machine. The complete hardware and software configuration must be carefully controlled, to avoid substitutions which introduce incompatibilities; the distribution process must be efficient in order to reduce the amount of information that is distributed; and revised system configurations must be manufactured and shipped very quickly in order to reduce the number of computers which leave the factory without the most current version of released software.

A further important constraint is time-to-market. The ability to meet consumer demands quickly, and provide the newest features as soon as possible, is crucial. Thus, the software pre-installation process must not be too rigid. It must remain in a state that allows new configurations and combinations of existing configurations to be integrated quickly and easily to satisfy changing customer demands.

Background: Rules-Based Software Selection

A properly configured computer should be installed with versions of software which are compatible with its hardware configuration. Further, the various software files should be compatible with each other. The zip deliverable method described above is one way to ensure that compatible software is installed onto a computer. However, unless the zip deliverable is coupled to a specific hardware configuration, compatibility problems may still arise.

An inference procedure, such as a rules based software selection method, can be used to ensure that the software installed on a computer is compatible with itself and with its supporting hardware. The rules take a heuristic approach to software selection decisions. That is, the result of application of the rules base to the hardware installed and the software packages desired is a list of the software components that need to be installed and configured.

A rules base for software selection can take on many forms. For example, it can be a flow chart in which, given the hardware selection, decision boxes for each software package to be installed are followed to determine the exact software configuration for the given machine. Multi-dimensional decision tables or decision trees can also be used to determine software configurations by hand.

Working through a rules base by hand for each software package can be time consuming and quickly become a bottleneck in the manufacturing process. This is especially the case when factors such as operating system choice and language are added. Furthermore, creating a decision chart for each hardware and software configuration is also time consuming. Finally, several different packages may require the same additional software, such as video drivers or TSRs, in order to run appropriately. Therefore, creating a software configuration list by hand can lead to duplicative effort and occasionally the mistaken installation of the same software multiple times.

Background: Hardware and Software Diagnostics

For any newly assembled computer, or even some computer hardware sub-assemblies such as hard drives, it is usually necessary to run a battery of tests (or "diagnostics") to ensure proper function. Such diagnostics can also be run for the software. However, because each computer can be configured in a slightly different way, a single diagnostic routine, or even a set of diagnostics may not be able to fully test a machine for proper configuration. It is often necessary to perform additional diagnostics for hardware such as high resolution video boards or tape backup drives that are not installed into every computer that is manufactured.

It is also necessary to test and configure software that is installed on a new computer before it is shipped. Today, in both consumer and business markets, ready-to-run computers are in demand. That is, when a new computer is received, the user expects to turn it on and immediately begin making beneficial use of it. Having to install and configure software is a time-consuming and sometimes technically challenging task for the casual computer user.

Pre-installation of software solves only part of this problem. Many modern software packages install easily but then require a lengthy set-up process before they are used for the first time. To avoid this situation, the software must be set up to run properly without requiring a lengthy dialog with the user. Diagnostic processes for software are capable of ensuring that the software is installed properly. Set-up processes can create and save most, if not all, of the information the software will need to run properly when it is first executed.

Like the hardware components that make up a newly manufactured computer, both diagnostic and set-up processes are different for each software package that is installed onto the computer. Therefore, each different software configuration installed on a computer requires a different set of diagnostics and set-up processes. The particular processes to be installed for testing of both hardware and software can be determined through a rules based procedure like that described above for the determination of software configurations.

Computer Manufacturing with Smart Configuration Methods

The present application describes a computer manufacturing architecture which automatically selects the appropriate software and diagnostic and set-up routines to install onto a computer or hard drive based on the installed hardware and software selections. Preferably a server with a rules database is used to receive software selections from the computer manufacturer. The selections are processed according to the rules base and a list of the software components and software and hardware diagnostics and set-up routines to be installed is produced. This list is used to download the appropriate software to the computer or hard drive.

In particular, the process utilizes a database table which contains rules associated with the hardware and software components which can be selected for installation in a new computer or hard drive. The server maintaining the database collects information concerning the hardware installed in a new computer, or the serial number of a raw hard drive, and the software to be installed on the computer or drive in the form of a list. The software portion of the list can include selections of an operating system, and various applications such as Wordperfect™ as well as information concerning the purchaser of the system and the language preference of the purchaser. The hardware portion of this list is formatted and stored for later use in the as-built database.

The hardware information is also used by the software selection rules base to determine which particular software packages to select for download. Given the hardware selections, installed operating system, and language preference, a customized rules set is built and evaluated to determine which software components will need to be downloaded. In addition to the determination of which software components to select for download, diagnostic and set-up routines are also determined by the same rules base.

A list containing hardware and software part numbers, including diagnostic and set-up routines is then stored in the as-built database for reference once the computer or hard drive is connected to the download network and prepared for pre-installation. After the software download has completed successfully, the diagnostic and set-up routines are activated in order to put the new computer or hard drive into a ready-to-run state.

Once the download and diagnostics have completed, the configuration of the machine may be saved for repeated use. If this option is selected, an image of the hard drive with its pre-installed and configured software is created and stored in the CCP database.

The above procedures are preferably combined with the software pre-installation process and "as-built" database described in application Ser. No. 09/070,589, filed Apr. 30, 1998 which is hereby incorporated by reference.

The advantages of the innovative optimized distribution model are numerous. Installation of software packages having known incompatibilities with hardware and other software packages can be avoided by the use of the rules base. With a reduction in incompatibilities, the manufacturer can be more confident in providing a greater variety of hardware and software configurations. With a greater number of configurations available, order takers have more options to offer and computer users have more combinations from which to choose.

Another advantage is that a software selection rules base offers more choices of software configuration than zip deliverables because every possible combination of software and hardware can be achieved through a small set of rules. With zip deliverables, even though every possible combination can be created, it is inefficient to create and distribute rarely used configurations.

Another advantage is that diagnostic and set-up processes which are tailored to a particular hardware and software configuration enable a more thorough testing of the hardware and software installed in the computer.

Another advantage is that a rules base held in a database which automatically selects the proper software to install based on a set of parameters greatly speeds the manufacturing process by eliminating a potential bottleneck caused by an installer having to walk through a flowchart or decision tree by hand to determine the proper software and testing procedures to be installed.

Another advantage is that previously built configurations can be saved and used on other machines, thereby reducing the time needed to construct a selection list for each new machine.

Another advantage of this innovative process is the capability to feed Quality-Control solutions based on passed or failed diagnostics back into the manufacturing process more quickly for delivery of a reliable product.

Another advantage is the ability to meet consumer demands with delivery of a reliable product in a very short period of time.

Another advantage is that separate disk images for each minor configuration change will not have to be produced and distributed, any configuration needed can be created via the software selection process.

Another advantage is more efficient updating: Updates to software can be released at any time and their rules for installation propagated throughout the system, without the need to rebuild multiple disk images and without the delay usually associated with their distribution.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 7A–C depict input windows for hardware and software component selection.

FIG. 14 shows a CTO build consisting of four SKU Components.

FIG. 15 illustrates standard BTF/BTO SKUs and BTF/BTO SKUs that consist of multiple SKU Components.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The present application has some drawings in common with and hereby incorporates by reference the following commonly-owned applications:

Ser. No. 09/070,603, filed simultaneously herewith;
Ser. No. 09/070,589, filed simultaneously herewith; and
Ser. No. 09/002,152, filed Dec. 31, 1997.

As software applications to run and support personal computers continue to become more functional and feature-rich, their physical size will also continue to grow. This growth in features and functionality directly affects the distribution systems used to deliver software configurations to be installed prior to consumer sale. As the number and size of different configurations grows, the system must be updated to continue to provide an effective distribution and installation mechanism.

A system of software distribution and installation that incorporates management of data and software configuration rules via a database, such as the one described in the present application over-comes many of the difficulties in the present software distribution system. Further, it allows minimization of storage requirements at computer manufacturing sites while maximizing the flexibility of software configurations that can be installed.

Figures 17, 18:
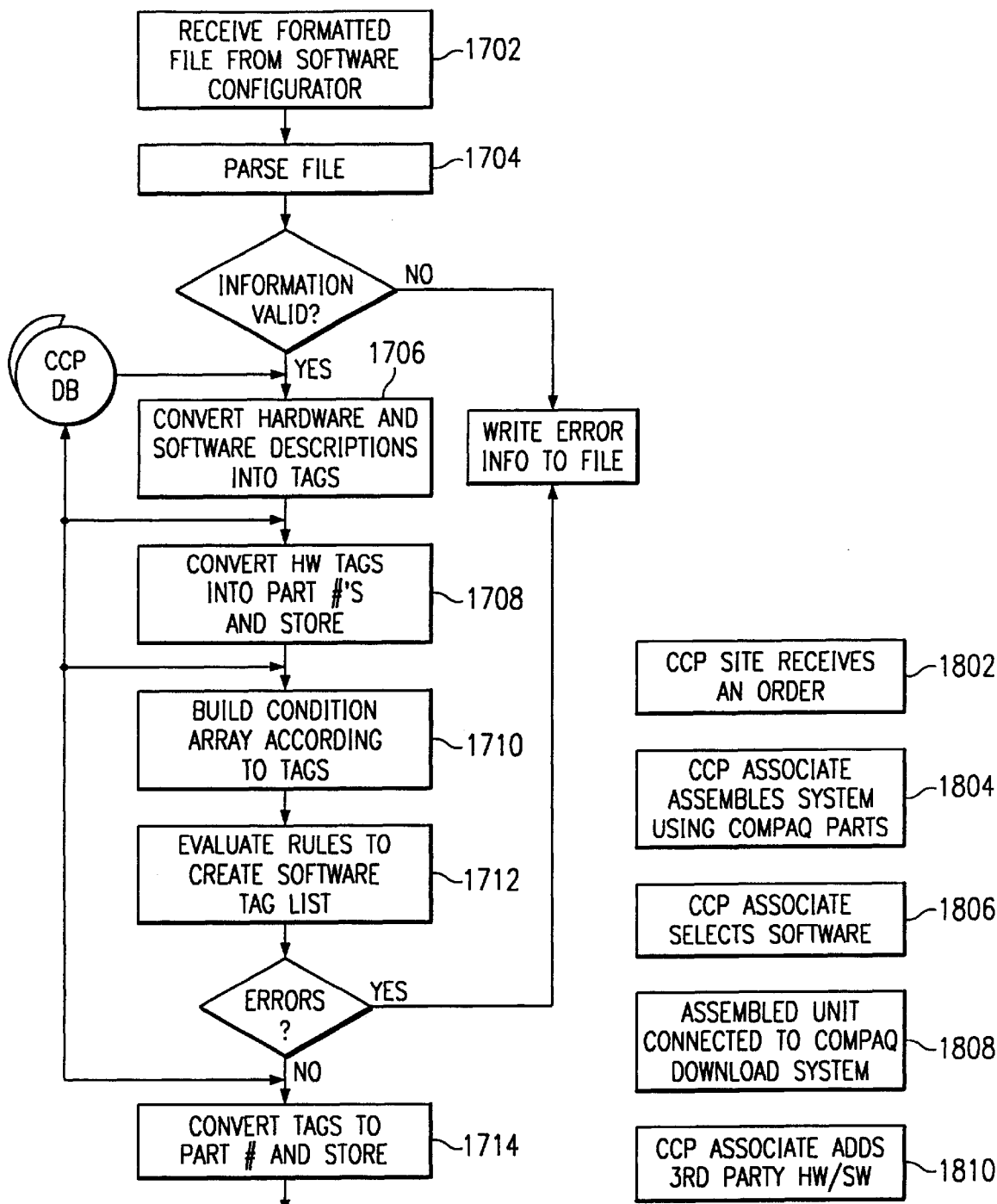
FIG. 17 depicts a flow chart of the process which converts hardware and software selections into a configuration file which is used to download the appropriate software and diagnostics onto the machine.
FIG. 18 depicts a block diagram of the procedures performed at the computer manufacturing facilities to prepare a computer for shipment.

To illustrate the context of the present disclosure, the following is offered as a brief overview. FIG. 18 depicts a block diagram of the procedures performed at the computer manufacturing facilities to prepare a computer for shipment. The present disclosure includes significant improvements at (Step 1806).

The receipt of an order for a computer or hard drive (Step 1802) initiates the smart configuration process. Once an order is received, the assembly of the hardware necessary (Step 1804) to complete the order begins. After assembly, sets of diagnostic tests are run on the unit to verify a basic hardware operation.

Next, the assembler selects the software that is to be installed onto the unit (Step 1806). One form of software selection allows the choice of a pre-built configuration of operating system and a set of software packages called an "image". Another form of software selection requires the designation of language, operating system, and applications.

If the assembler elects not to install an image, a set of rules is used to evaluate the selections. A list including operating system software, applications software, utilities, drivers for the installed hardware, and diagnostic and software set-up routines is automatically created and save in a configuration database during the evaluation process.

The unit is then connected to the software download system (Step 1808). The software download includes the loading of the selected software. Diagnostics and set-up routines are loaded into a partition that will be deleted upon their completion. The diagnostics verify that the hardware sub-assemblies identified at the beginning of the process are installed and working correctly. A software verification program verifies that the selected software files have been installed without corruption. Finally, a post-processing configuration tool configures the software components on the unit, if necessary, and applies a certificate of authenticity number to the operating system, if installed).

Next, any third party hardware or software is installed (Step 1810). Finally, the assembler performs a final check of the unit before packing and shipping (step 1812). When the inspection is complete, the unit is marked as shipped in the configuration database.

Along with the growth in complexity and number of hardware and software options that can be installed on a personal computer has come the desire of the purchaser for a ready-to-run system, i.e., a computer (including keyboard, monitor, and other peripherals) that can be connected, booted, and put to beneficial use almost immediately. This type of system is quite different from those delivered just a few years ago in which the software to run, and run on, the machine may have come with the purchase but was not installed.

In addition to software pre-installation, diagnostics for both hardware and software performed after the software is installed help to ensure that the computer is in operating condition before it leaves the manufacturing facility.

Set-up procedures are used to put the newly installed software into a ready-to-run mode. Most modern software packages such as word processors require information about the particular hardware and operating environment in which they are installed to operate correctly. Set-up procedures tailored to the packages and installed hardware can create the information needed by the software at startup to ensure a machine that is ready-to-run by the purchaser.

Definitions

Assembled Unit: The computer system that is built from the manufacturer's hardware and software components. Third-party hardware and software may be added after the manufacturer's system is built.

Attributes: Each entity may have properties that stores information about the entity. These properties are called the attributes of an entity.

BLOb ("Binary Large Object"): A data type which can be stored in a database as a non-fixed length record. Typically used in storage of text or various kinds of binary images.

BOM ("Bill-of-Materials"): In this document, BOM refers to a software bill-of-materials. A BOM is associated with a list of compressed and/or non-compressed software files that are copied to a computer during software pre-installation.

CCP: Channel Configuration Program

CCP Assembly Cell: A physical location where computer systems are assembled.

CCP Associate: The individual responsible for assembling a computer system in the CCP Cell.

CCP Client Program: The database collection and software configuration program that executes on the CCP Client Station CCP Client Workstation: The system that is connected to the CCP database and is used for data capture and software configuration in the CCP Cell.

CCP Download Control Program: A program that executes in the assembled unit at software download time.

CCP Download diskette: The diskette that contains programs used for software download. This diskette is used on the assembled unit.

CCP Server Control Program: The CCP Server Control Program (SCP) provides an interface that is a functional replacement for the Shop Floor Data Management (SFDM) system in a manufacturing facility.

COA: Certificate of Authenticity.

CTO: Configure-to-Order: Systems built and configured upon receipt of a customer order.

DBMS ("Data Base Management System"): A product that supports the reliable storage of the database, implements the structures for maintaining relationships and constraints, and offers storage and retrieval services to users.

DSD: PRISM Surrogate Download System is a tool to place software on a target drive that is already installed in the target unit.

Entity: Entities can be defined as any person, place, thing, event, or concept about which information is kept. Nouns, like "car", "computer" or "desk" usually name entities ERD ("Entity Relationship Diagram"): A graphical representation of the relationship present in a relational database.

FAT ("File Allocation Table"): The information used by operating system software to manage files on a hard disk.

FIST ("Factory Isolation Standard Tables"): The main software interface by which all installation data preferably flows into the factory.

FUN ("Functional Normalization"): A process of elimination of duplicate files between divisions.

GEMINI: An image builder/data blaster download tool for both surrogate and direct downloading.

Line Server: A file server which serves at least one assembly line for installation of files on the hard disks of assembled computers. In the system behind FIST, the line server becomes mainly a host for a DBMS-based storage of the files to be installed.

Local PRISM Server: A server located at the CCP site that is not on the Factory PRISM Network. Images created locally are stored in the system.

MBR ("Master Boot Record"): The MBR contains minimal operating system code to load the boot sector of the partition marked as startable (or bootable), and the description of the partitions located on the hard disk.

Master Server: A file server with massive storage resources is used as the central repository for all installable files in a manufacturing facility. In the system behind FIST it becomes mainly a host for a DBMS-based storage of the files to be distributed to line servers in each factory.

PRISM ("Preinstall Reengineering Initiative for Software Management"): The factory system responsible for putting software on manufactured systems.

PRISM Line Server: A server located at the CCP site that is not on the PRISM Factory Network. Images created locally are stored in the system.

Replication: A feature of SQL Server 6.x (and many other DBMSs) which is being exploited by FIST to improve file transmission system between a headquarters site and the factories. It allows all or just certain records to be copied under certain criteria to other databases using a 'Publish and Subscribe' metaphor where one database is the publisher and all subscribers get data copied to them from the publisher.

SFDM: Shop Floor Data Management System

SKU ("Stock Keeping Unit"): A SKU is created from the part number. The description identifies the CPU, the primary hard disk, the country/keyboard and whether or not software will be pre-installed in the factory during manufacture.

Software Part Number: A standard 6-3 part number with a Material Description Code of 1005 (BTOCTO Software).

SQL ("Structured Query Language"): A language method of accessing and maintaining a database. Also used to refer to the database itself that uses this type of language.

User: A person who operates the surrogate or direct download system.

UUT: Unit Under Test—The system currently undergoing test.

Summary Overview

The preferred embodiment discloses a system of software installation which is managed by a rules based software configuration process. This process provides for pre-installation of software and diagnostic and set-up routines that are particularly matched to the software and hardware environment. Once installed and configured, the computer or hard drive will be ready-to-run upon receipt by the purchaser.

The software and diagnostic and set-up routine rules base makes use of a network of database servers to transmit the rules which control the possible hardware and software selections from a software engineering group which created the software to be installed to remote manufacturing facilities. At the same time, the software available to be installed is transmitted to remote manufacturing facilities over a network of database servers.

At the remote manufacturing facility, the hardware and software that will constitute the computer or hard drive to be delivered is selected and entered into a software selection process along with information concerning the purchaser, such as name, location, and preferred language for the software to be installed.

The hardware and software selected is associated with a tag that generically identifies it for the rules base and stored in a list. A customized rules set is created based on the hardware, language and operating system selections made. The list of tags is evaluated against the rules set and translated into a list of installed hardware and software configuration components which includes references to the software selected, in the appropriate language preference, if available, drivers for the installed hardware, if necessary, any supporting software, and diagnostic and set-up routines for the software and hardware selected. This list of components is stored in the "as-built" database on the rules base server.

When the computer or hard drive is ready for software pre-installation it is connected to the network with the PRISM server and database. The serial number of the computer or hard drive is used by a process running on the PRISM server to obtain the list of software to pre-install from the database running on the rules base server. Once the software is installed, the computer containing the hard drive is booted in order for the diagnostic and set-up routines to be run. If the diagnostic and set-up routines are successful, the configuration for the machine is marked as loaded and the hardware and software configuration becomes part of the "as-built" database used by royalty tracking and customer service.

General Organization of Database Servers and Process Flow

Figure 1:
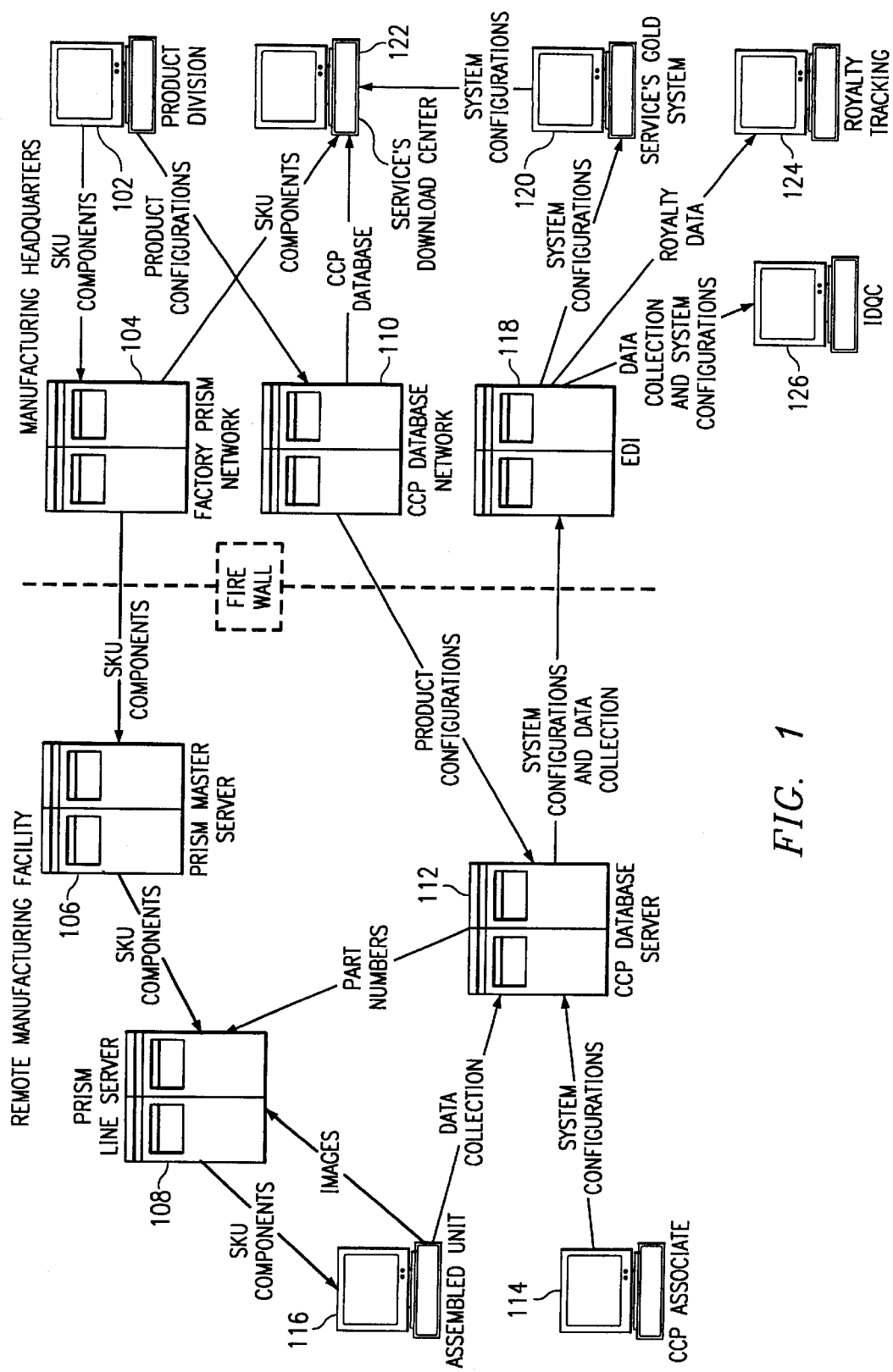
FIG. 1 shows a block diagram of the data flows between and within a remote manufacturing facility and manufacturing headquarters.
Figure 3:
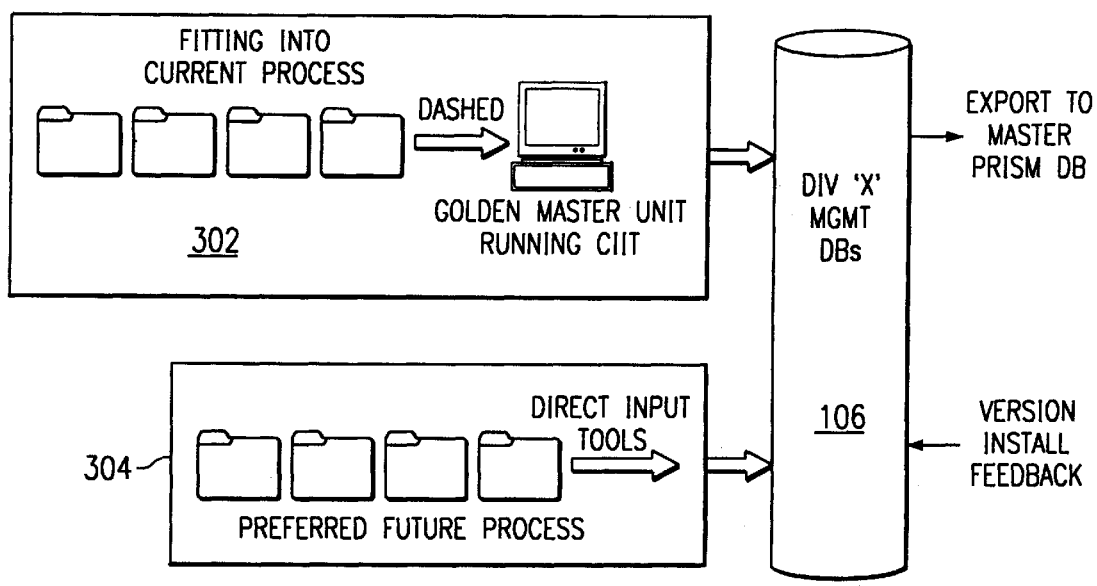
FIG. 3 shows a block diagram of the method by which software may be released into the novel computer manufacturing software download distribution system.

FIG. 3 illustrates, in block diagram form, two methods by which software may be released by software engineering groups into the software distribution system in a manner conforming to the ERDs of the distribution system's database. This figure is more fully described in Ser. No. 09/070, 603, filed simultaneously herewith. FIG. 1 shows an architectural overview in block diagram form of the hardware, interconnectivity, and data distribution flow preferably used to embody the novel computer manufacturing software installation and tracking system. This system is designed to provide efficient software distribution, configuration, installation, and tracking of software and hardware. The software distribution and installation system allows for release of software by one or more software engineering groups 102, each with its own development schedule, into a database network 104 which eliminates any duplicate files which may exist between groups and between versions of software released by the same group. The resulting database and software files are distributed to various master database servers at remote manufacturing facilities 106. From these master databases, software is distributed to one or more local databases and their associated servers 108 for download onto personal computers in either a predetermined ("as configured"), build-to-order, or configure-to-order configuration. In parallel with the above described distribution of software files, rules for the configuration of the software are created and distributed, again by one or more software engineering groups 102, through the configuration and tracking system. The product configurations are released into a separate database network 110. The resulting information is distributed to various CCP servers residing at remote manufacturing facilities 112. Once both the software and configuration rules have been distributed to the manufacturing facility, software pre-installation can commence. The process communicates with the product configurations database 112. The product configurations database 112 holds information concerning configurations for particular assembled units and hard drives as well as the rules for configuring new units and hard drives. A process is run at the manufacturing facility on a client station 114 which accesses the product configuration database 112 and allows a hardware and software configuration list to be created or changed if it already exists. This process also references and enforces the rules of hardware and software configuration contained on the database 112. Once a configuration list has been created, the assembled unit (or raw hard drive in a surrogate machine) 116 is connected to the network. A separate process running on the assembled unit 116 accesses the product configuration database 112 and retrieves its configuration list. The process then accesses a local software database 108 and commences the actual download of information onto its hard drive. Once the software has been downloaded successfully, diagnostic checks are performed and software set-up routines are run on the assembled unit 116 and product configuration database 112 is updated to reflect that a software pre-installation has taken place for the particular machine 116. The configuration list for the particular machine can then be used as "as built" data. This data is transmitted back to a database network 118 at manufacturing headquarters. This "as built" information can then be distributed to customer service systems 120 including service centers 122 which can rebuild a customer's hard drive based on the "as built" information. The information can also be used by royalty tracking systems 124 to ensure appropriate payment to third-party software providers and configuration and failure analysis systems 126 to evaluate diagnostic, download completion, and other data related to software pre-installation.

Figure 9:
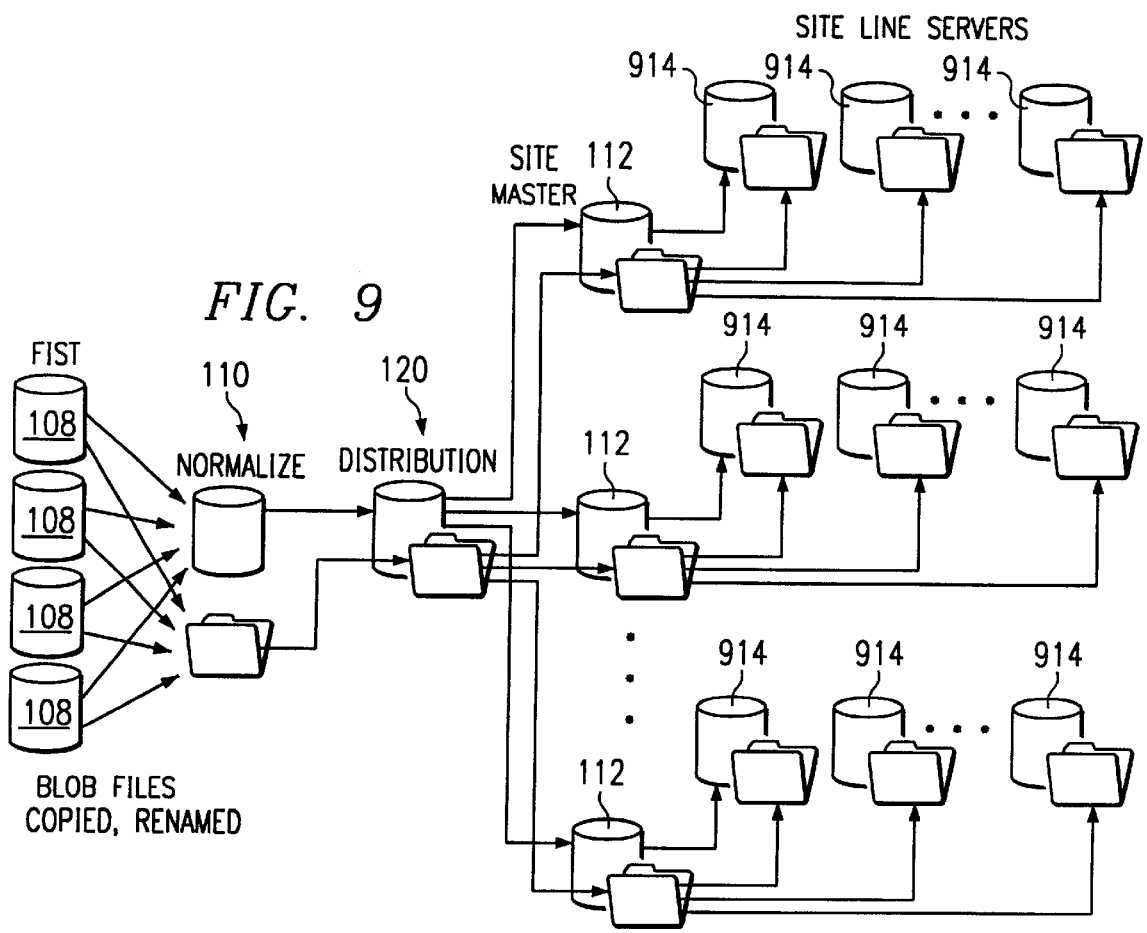
FIG. 9 shows a block diagram of the method by which data associated with released software in the master isolated database is replicated to remote manufacturing sites.

FIG. 9 shows a block diagram of the method by which data associated with released software in the master isolated database is replicated to remote manufacturing sites. This figure is more fully described in Ser. No. 09/070,589, filed simultaneously herewith.

The ERDs which describe the hardware and software configuration rules portion of the CCP database information used during the software pre-installation process will be described first. Next, the server and database architecture which supports the software selection process, list translation, and rules base will be discussed in detail. The servers utilized at the remote manufacturing facility are distinguishable from common LAN servers. The servers used in this process support database storage and the DBMSs which manage the data. The servers also provide processing in the form of executables which retrieve and manipulate data from the server's local database or from the databases of other servers.

The process of software selection and hardware component entry will be described next. This process creates the software selection list. Then the process which translates the software selection list transmitted by the software selection program will be described. Finally, the diagnostic and set-up routines will be described.

The Relational Database Structure

Figure 5A:
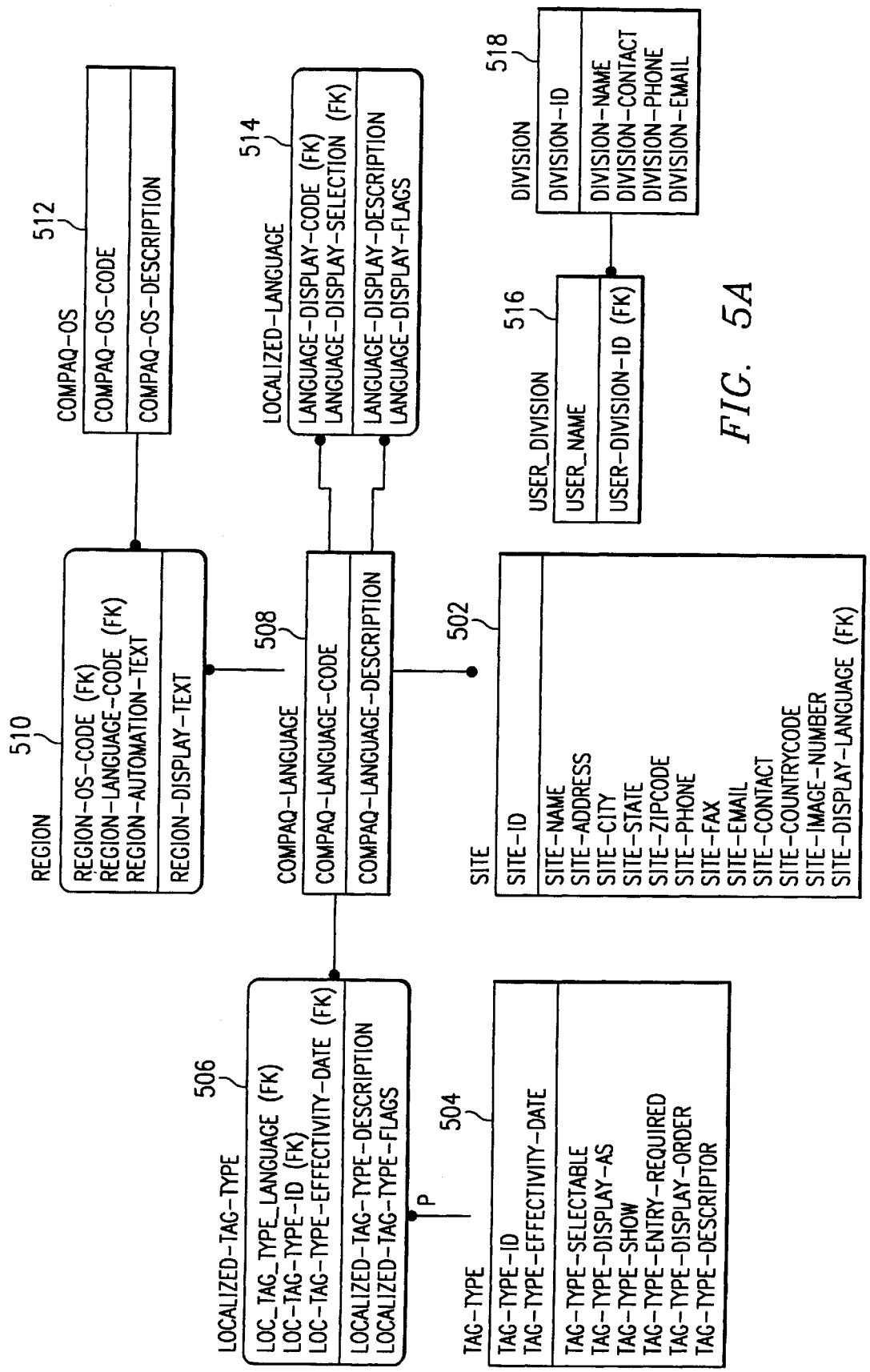
FIGS. 5A–C shows an Entity-Relationship Diagram which describes the relational database structure utilized in the rules based software configuration process.
Figure 5B:
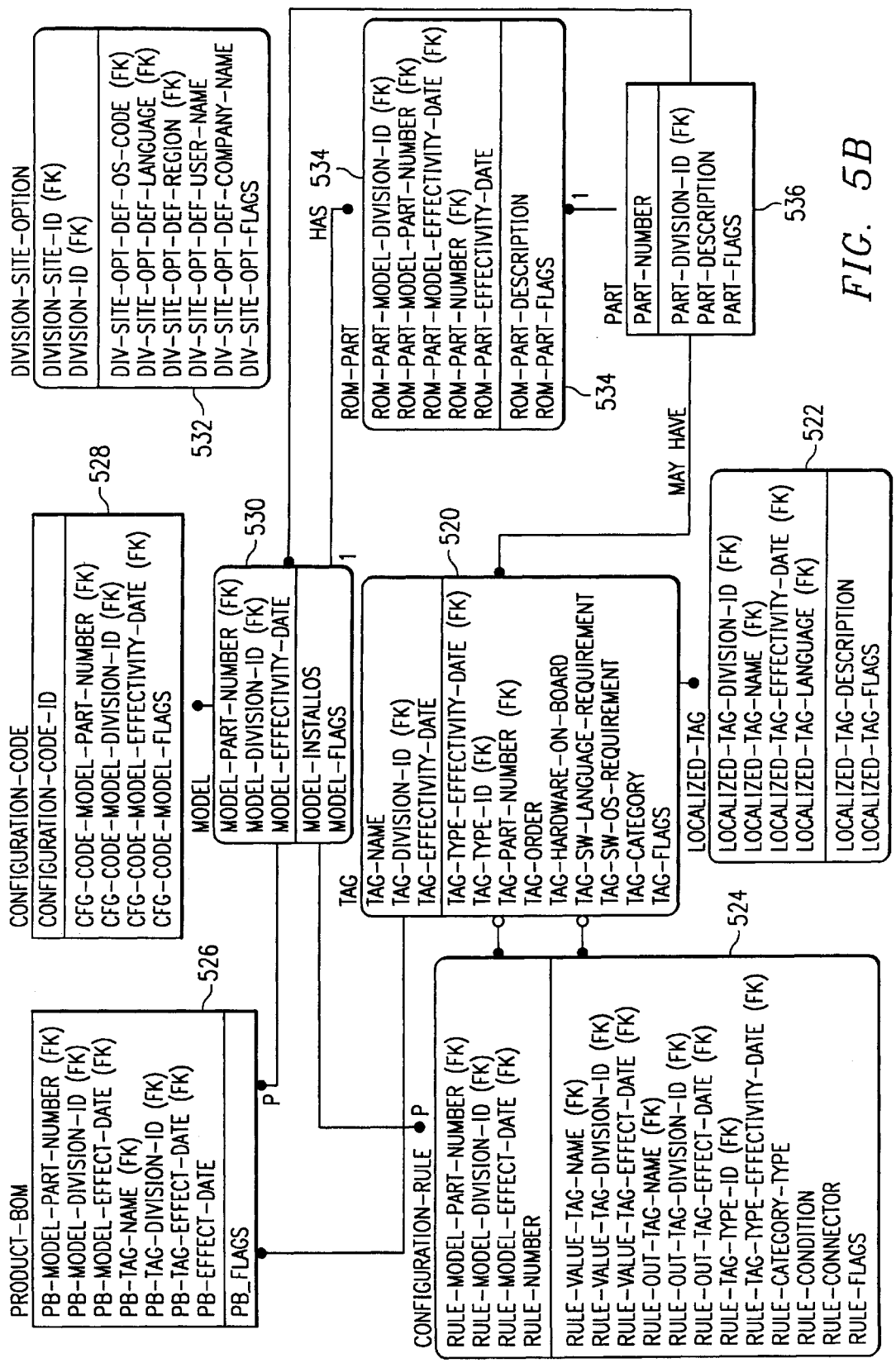
Figure 5C:
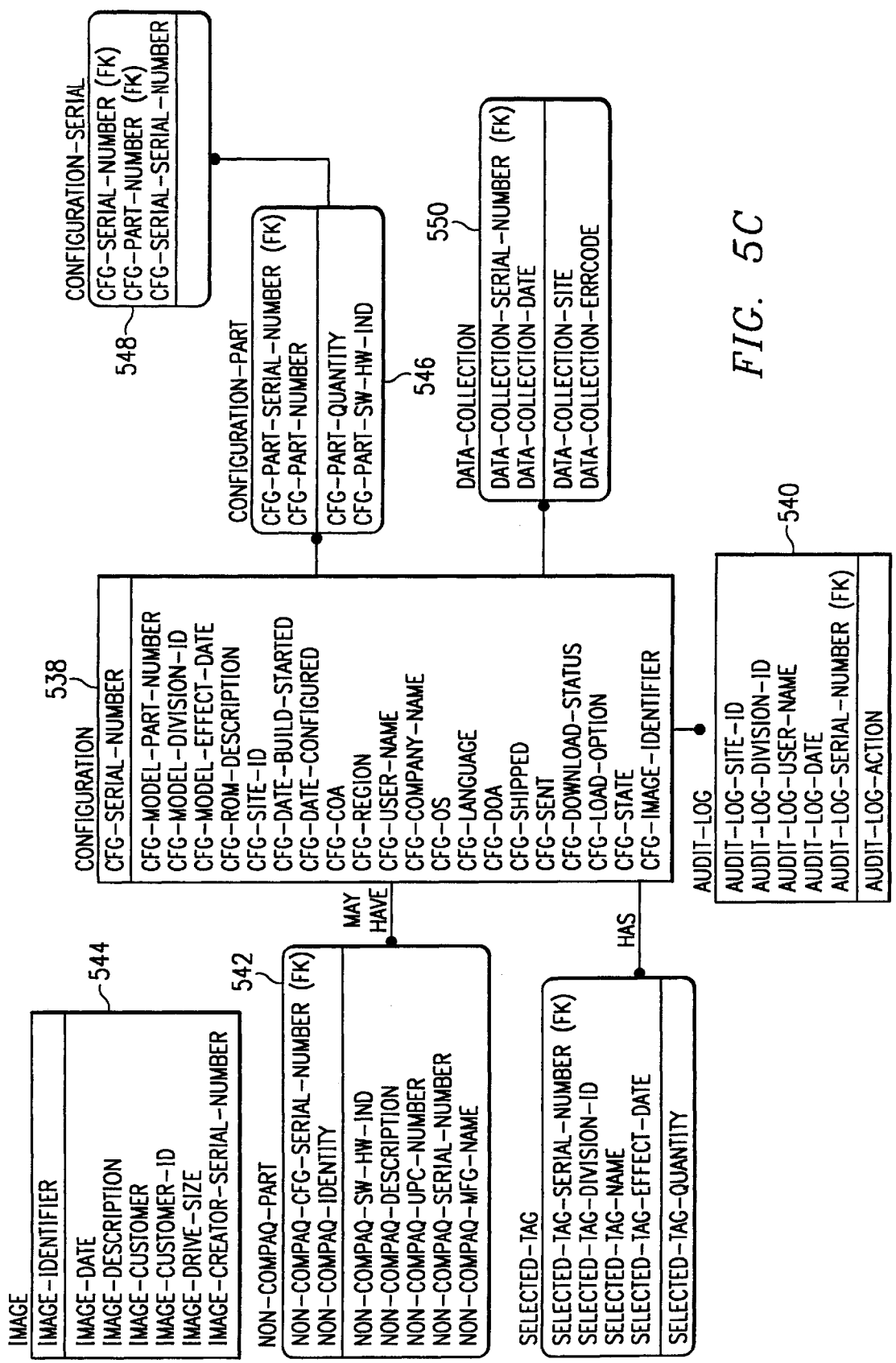

FIGS. 5A–C show the ERD which describes the relational database structure utilized in the preferred embodiment. The ERD defines to the DBMS how the data will be retrieved, deleted, added, and updated in the software distribution system. The ERD has been optimized in order to take minimal storage space in fully describing the released software. In this view of the complete tables, it will be noted that there are primary key fields on many of the tables. These special keys are generated automatically on insertions to those tables, and are necessary for replication purposes. In some cases, where it is necessary to include the primary key (PK) from one table as a foreign key (FK) in another, it is necessary to query back the table entry just made to get this primary key.

The database is constructed so that all of a division's information is distinct from another division's information. The physical tables may be the same but the data are uniquely identified for a specific division.

The Company database, composed of the CCP and PRISM database, contains:

One or more divisions,

TAG-type database,

Hardware and Software Part Numbers, and

Configuration Options.

The Division database, composed of the CCP and PRISM database, contains:

One or more product databases,

TAGs,

Configuration Options, and

Audit Information.

Each Product database will contain:

Hardware part number assemblies, part numbers for the Flash ROMs used in the product, configuration rules used by the Software Selection program, configuration definitions for systems that have been built, Product Configuration Options, the definitions for images that were saved by the CCP Associate, and Product BOMs Each Entity and its definition are described in the tables of this section.

| Entity Name | Entity Definition |
|---|---|
| AUDIT-LOG | Records all actions against the CCP database. Where; when; and who did the action. |
| COMPAQ-LANGUAGE | All Compaq language codes. |

-continued

| Entity Name | Entity Definition |
|---|---|
| COMPAQ-OS | All unique operating system identifiers supported by Compaq. |
| CONFIGURATION | Describes a Compaq system built at the CCP site. |
| CONFIGURATION-CODE | Contains family (configuration) codes for each base model part number. |
| CONFIGURATION-PART | Part numbers of Compaq added software and hardware. |
| CONFIGURATION-RULE | Rules are a method of establishing dependencies between hardware and software part number tags or between two software part number tags. |
| CONFIGURATION-SERIAL | Records serial number for Compaq components added to a system configuration. |
| DATA-COLLECTION | Stores the status of diagnostics software download and post processing. PASS/FAIL is recorded. |
| DIVISION | Identifies all Compaq divisions building systems in the Channel Configuration Program. |
| DIVISION-SITE-OPTION | Site-specific default information. Language and operating system defaults for a site are stored here. |
| IMAGE | A fully configured image for a Configuration. Describes all partition and file information for a system. |
| LOCALIZED-LANGUAGE | Localized language names. |
| LOCALIZED-TAG | The localized string for a TAG description used for display. |
| LOCALIZED-TAG-TYPE | Stores the translated description of TAG types for display purposes. |
| MODEL | Slots and bays for a Model-1 Base Configuration. |
| NON-COMPAQ-PART | Describes the non-Compaq software and hardware added to a Compaq system at the CCP site. |
| PART | Defines all valid Compaq hardware and software part numbers. |
| PRODUCT-BOM | Contains all TAGs for a specific product model. |
| REGION | Contains REGION descriptions used during regional settings selection. |
| ROM-PART | Description of FLASH ROM parts. Identified by Model-1 base configuration. |
| SELECTED-TAG | Contains all selected TAGs for a system configuration. This includes the hardware and software TAGs. |
| SITE | Master list of all CCP sites. Default configuration information about the site. |
| TAG | Part Number Tag definition. Used as an abstraction of a real part number. |
| TAG-TYPE | Display and entry parameters for a TAG. |
| USER_DIVISION | Used to validate access to the CCP Corp Master server from the divisions. A stored procedure validates requesting user against users in this table. |

Entity-Attribute Relationships

Each Entity and its attributes are described in the tables in this section.

| ENTITY NAME | ATTRIBUTE NAMES |
|---|---|
| AUDIT-LOG | AUDIT-LOG-SITE-ID (PK) |
|  | AUDIT-LOG-DIVISION-ID (PK) |
|  | AUDIT-LOG-USER-NAME (PK) |
|  | AUDIT-LOG-DATE (PK) |
|  | AUDIT-LOG-SERIAL-NUMBER (PK) (FK) |
|  | AUDIT-LOG-ACTION |
| COMPAQ-LANGUAGE | COMPAQ-LANGUAGE-CODE (PK) |
|  | COMPAQ-LANGUAGE-DESCRIPTION |
| COMPAQ-OS | COMPAQ-OS-CODE (PK) |
|  | COMPAQ-OS-DESCRIPTION |
| CONFIGURATION | CFG-SERIAL-NUMBER (PK) |
|  | CFG-MODEL-PART-NUMBER |
|  | CFG-MODEL-DIVISION-ID |
|  | CFG-MODEL-EFFECT-DATE |
|  | CFG-ROM-DESCRIPTION |
|  | CFG-SITE-ID |
|  | CFG-DATE-BUILD-STARTED |
|  | CFG-DATE-CONFIGURED |
|  | CFG-COA |
|  | CFG-REGION |
|  | CFG-USER-NAME |
|  | CFG-COMPANY-NAME |
|  | CFG-OS |
|  | CFG-LANGUAGE |
|  | CFG-DOA |
|  | CFG-SHIPPED |
|  | CFG-SENT |
|  | CFG-DOWNLOAD-STATUS |
|  | CFG-LOAD-OPTION |
|  | CFG-STATE |
|  | CFG-IMAGE-IDENTIFIER |
| CONFIGURATION-CODE | CONFIGURATION-CODE-ID (PK) |
|  | CFG-CODE-MODEL-PART-NUMBER (FK) |
|  | CFG-CODE-MODEL-DIVISION-ID (FK) |
|  | CFG-CODE-MODEL-EFFECTIVITY-DATE (FK) |
|  | CFG-CODE-MODEL-FLAGS |
| CONFIGURATION-PART | CFG-PART-SERIAL-NUMBER (PK) (FK) |
|  | CFG-PART-NUMBER (PK) |
|  | CFG-PART-QUANTITY |
|  | CFG-PART-SW-HW-IND |
| CONFIGURATION-RULE | RULE-MODEL-PART-NUMBER (PK) (FK) |
|  | RULE-MODEL-DIVISION-ID (PK) (FK) |
|  | RULE-MODEL-EFFECT-DATE (PK) (FK) |
|  | RULE-NUMBER (PK) |
|  | RULE-VALUE-TAG-NAME (FK) |
|  | RULE-VALUE-TAG-DIVISION-ID (FK) |
|  | RULE-VALUE-TAG-EFFECT-DATE (FK) |
|  | RULE-OUT-TAG-NAME (FK) |
|  | RULE-OUT-TAG-DIVISION-ID (FK) |
|  | RULE-OUT-TAG-EFFECT-DATE (FK) |
|  | RULE-TAG-TYPE-ID (FK) |
|  | RULE-TAG-TYPE-EFFECTIVITY-DATE (FK) |
|  | RULE-CATEGORY-TYPE |
|  | RULE-CONDITION |
|  | RULE-CONNECTOR |
|  | RULE-FLAGS |
| CONFIGURATION-SERIAL | CFG-SERIAL-NUMBER (PK) (FK) |
|  | CFG-PART-NUMBER (PK) (FK) |
|  | CFG-SERIAL-SERIAL-NUMBER (PK) |
| DATA-COLLECTION | DATA-COLLECTION-SERIAL-NUMBER (PK) (FK) |
|  | DATA-COLLECTION-DATE (PK) |
|  | DATA-COLLECTION-SITE |
|  | DATA-COLLECTION-ERRCODE |
| DIVISION | DIVISION-ID (PK) |
|  | DIVISION-NAME |
|  | DIVISION-CONTACT |
|  | DIVISION-PHONE |
|  | DIVISION-EMAIL |
| DIVISION-SITE-OPTION | DIVISION-SITE-ID (PK) (FK) |
|  | DIVISION-ID (PK) (FK) |
|  | DIV-SITE-OPT-DEF-OS-CODE (FK) |
|  | DIV-SITE-OPT-DEF-LANGUAGE (FK) |
|  | DIV-SITE-OPT-DEF-REGION (FK) |
|  | DIV-SITE-OPT-DEF-USER-NAME |
|  | DIV-SITE-OPT-DEF-COMPANY-NAME |
|  | DIV-SITE-OPT-FLAGS |
| IMAGE | IMAGE-IDENTIFIER (PK) |
|  | IMAGE-DATE |
|  | IMAGE-DESCRIPTION |
|  | IMAGE-CUSTOMER |
|  | IMAGE-CUSTOMER-ID |
|  | IMAGE-DRIVE-SIZE |
|  | IMAGE-CREATOR-SERIAL-NUMBER |
| LOCALIZED-LANGUAGE | LANGUAGE-DISPLAY-CODE (PK) (FK) |
|  | LANGUAGE-DISPLAY-SELECTION |

-continued

| ENTITY NAME | ATTRIBUTE NAMES |
|---|---|
| LOCALIZED-TAG | (PK) (FK)<br>LANGUAGE-DISPLAY-DESCRIPTION<br>LANGUAGE-DISPLAY-FLAGS<br>LOCALIZED-TAG-DIVISION-ID (PK) (FK)<br>LOCALIZED-TAG-NAME (PK) (FK)<br>LOCALIZED-TAG-EFFECTIVITY-DATE (PK) (FK)<br>LOCALIZED-TAG-LANGUAGE (PK) (FK)<br>LOCALIZED-TAG-DESCRIPTION<br>LOCALIZED-TAG-FLAGS |
| LOCALIZED-TAG-TYPE | LOC_TAG_TYPE_LANGUAGE (PK) (FK)<br>LOC-TAG-TYPE-ID (PK) (FK)<br>LOC-TAG-TYPE-EFFECTIVITY-DATE (PK) (FK)<br>LOCALIZED-TAG-TYPE-DESCRIPTION<br>LOCALIZED-TAG-TYPE-FLAGS |
| MODEL | MODEL-PART-NUMBER (PK) (FK)<br>MODEL-DIVISION-ID (PK) (FK)<br>MODEL-EFFECTIVITY-DATE (PK)<br>MODEL-INSTALLOS<br>MODEL-FLAGS |
| NON-COMPAQ-PART | NON-COMPAQ-CFG-SERIAL-NUMBER (PK) (FK)<br>NON-COMPAQ-IDENTITY (PK)<br>NON-COMPAQ-SW-HW-IND<br>NON-COMPAQ-DESCRIPTION<br>NON-COMPAQ-UPC-NUMBER<br>NON-COMPAQ-SERIAL-NUMBER<br>NON-COMPAQ-MFG-NAME |
| PART | PART-NUMBER (PK)<br>PART-DIVISION-ID (FK)<br>PART-DESCRIPTION<br>PART-FLAGS |
| PRODUCT-BOM | PB-MODEL-PART-NUMBER (PK) (FK)<br>PB-MODEL-DIVISION-ID (PK) (FK)<br>PB-MODEL-EFFECT-DATE (PK) (FK)<br>PB-TAG-NAME (PK) (FK)<br>PB-TAG-DIVISION-ID (PK) (FK)<br>PB-TAG-EFFECT-DATE (PK) (FK)<br>PB-EFFECT-DATE (PK)<br>PB_FLAGS |
| REGION | REGION-OS-CODE (PK) (FK)<br>REGION-LANGUAGE-CODE (PK) (FK)<br>REGION-AUTOMATION-TEXT (PK)<br>REGION-DISPLAY-TEXT |
| ROM-PART | ROM-PART-MODEL-DIVISION-ID (PK) (FK)<br>ROM-PART-MODEL-PART-NUMBER (PK) (FK)<br>ROM-PART-MODEL-EFFECTIVITY-DATE (PK) (FK)<br>ROM-PART-NUMBER (PK) (FK)<br>ROM-PART-EFFECTIVITY-DATE (PK)<br>ROM-PART-DESCRIPTION<br>ROM-PART-FLAGS |
| SELECTED-TAG | SELECTED-TAG-SERIAL-NUMBER (PK) (FK)<br>SELECTED-TAG-DIVISION-ID (PK)<br>SELECTED-TAG-NAME (PK)<br>SELECTED-TAG-EFFECT-DATE (PK)<br>SELECTED-TAG-QUANTITY |
| SITE | SITE-ID (PK)<br>SITE-NAME<br>SITE-ADDRESS<br>SITE-CITY<br>SITE-STATE<br>SITE-ZIPCODE<br>SITE-PHONE<br>SITE-FAX<br>SITE-EMAIL<br>SITE-CONTACT<br>SITE-COUNTRYCODE<br>SITE-IMAGE-NUMBER<br>SITE-DISPLAY-LANGUAGE (FK) |
| TAG | TAG-NAME (PK)<br>TAG-DIVISION-ID (PK) (FK)<br>TAG-EFFECTIVITY-DATE (PK)<br>TAG-TYPE-EFFECTIVITY-DATE (FK)<br>TAG-TYPE-ID (FK)<br>TAG-PART-NUMBER (FK)<br>TAG-ORDER<br>TAG-HARDWARE-ON-BOARD<br>TAG-SW-LANGUAGE-REQUIREMENT<br>TAG-SW-OS-REQUIREMENT<br>TAG-CATEGORY<br>TAG-FLAGS |
| TAG-TYPE | TAG-TYPE-ID (PK) (AK1)<br>TAG-TYPE-EFFECTIVITY-DATE (PK) (AK1)<br>TAG-TYPE-SELECTABLE<br>TAG-TYPE-DISPLAY-AS<br>TAG-TYPE-SHOW<br>TAG-TYPE-ENTRY-REQUIRED<br>TAG-TYPE-DISPLAY-ORDER<br>TAG-TYPE-DESCRIPTOR (AK1) |
| USER_DIVISION | USER_NAME (PK)<br>USER-DIVISION-ID (FK) |

Attribute Definition

Each attribute, along with its usage as a Primary or Foreign key, its definition, and the entity that uses it.

| Attribute Name | PK | FK | Attribute Definition | Entity Usage |
|---|---|---|---|---|
| AUDIT-LOG-ACTION | | | The type of operation executed by the CCP Associate. | AUDIT-LOG |
| AUDIT-LOG-DATE | (PK) | | The date that the action occurred. | AUDIT-LOG |
| AUDIT-LOG-DIVISION-ID | (PK) | | | AUDIT-LOG |
| AUDIT-LOG-SERIAL-NUMBER | (PK) | (FK) | The serial number of the base unit. | AUDIT-LOG |
| AUDIT-LOG-SITE-ID | (PK) | | | AUDIT-LOG |
| AUDIT-LOG-USER-NAME | (PK) | | The logon name for the user. | AUDIT-LOG |
| CFG-COA | | | The Certificate of Authenticity number for the operating system selected. | CONFIGURATION |

-continued

| Attribute Name | PK | FK | Attribute Definition | Entity Usage |
|---|---|---|---|---|
| CFG-CODE-MODEL-DIVISION-ID | | (FK) | | CONFIGURATION-CODE |
| CFG-CODE-MODEL-EFFECTIVITY-DATE | | (FK) | | CONFIGURATION-CODE |
| CFG-CODE-MODEL-FLAGS | | | Export and Test bits. | CONFIGURATION-CODE |
| CFG-CODE-MODEL-PART-NUMBER | | (FK) | | CONFIGURATION-CODE |
| CFG-COMPANY-NAME | | | The company name entered for this configuration. | CONFIGURATION |
| CFG-DATE-BUILD-STARTED | | | The date that the build began for this configuration. | CONFIGURATION |
| CFG-DATE-CONFIGURED | | | The date that the part numbers were requested by PRISM for a download. | CONFIGURATION |
| CFG-DOA | | | TRUE = Unit is dead-on-arrival. | CONFIGURATION |
| CFG-DOWNLOAD-STATUS | | | Status for software download for the configuration. | CONFIGURATION |
| CFG-IMAGE-IDENTIFIER | | | Identifies the image part number used. | CONFIGURATION |
| CFG-LANGUAGE | | | Language version for the installed software. | CONFIGURATION |
| CFG-LOAD-OPTION | | | The type of software load performed for the unit: None Components or Image. | CONFIGURATION |
| CFG-MODEL-DIVISION-ID | | | Division id for mase model | CONFIGURATION |
| CFG-MODEL-EFFECT-DATE | | | Date that the base model definition becomes effective. | CONFIGURATION |
| CFG-MODEL-PART-NUMBER | | | Part number base-model | CONFIGURATION |
| CFG-OS | | | Operating system selection used in this configuration. | CONFIGURATION |
| CFG-PART-NUMBER | (PK) | (FK) | | CONFIGURATION-SERIAL |
| CFG-PART-NUMBER | (PK) | | Part number of the Compaq option. | CONFIGURATION-PART |
| CFG-PART-QUANTITY | | | The number of parts used by the configuration. | CONFIGURATION-PART |
| CFG-PART-SERIAL-NUMBER | (PK) | (FK) | Serial number of configuration whose part numbers are defined here. | CONFIGURATION-PART |
| CFG-PART-SW-HW-IND | | | Hardware or Software part. | CONFIGURATION-PART |
| CFG-REGION | | | The country or region selected during software selection. | CONFIGURATION |
| CFG-ROM-DESCRIPTION | | | ROM description | CONFIGURATION |
| CFG-SENT | | | The configuration information has been sent. | CONFIGURATION |
| CFG-SERIAL-NUMBER | (PK) | (FK) | | CONFIGURATION-SERIAL |
| CFG-SERIAL-NUMBER | (PK) | | Serial number for the unit. | CONFIGURATION |
| CFG-SERIAL-SERIAL-NUMBER | (PK) | | | CONFIGURATION-SERIAL |
| CFG-SHIPPED | | | All configuration for a unit has been completed. | CONFIGURATION |
| CFG-SITE-ID | | | A unique identifier assigned to a CCP Site. This value is retrieved from the system registry. | CONFIGURATION |
| CFG-STATE | | | | CONFIGURATION |
| CFG-USER-NAME | | | The user name entered for this configuration. | CONFIGURATION |
| COMPAQ-LANGUAGE-CODE | (PK) | | A two-character code defined by drawing 130–955. | COMPAQ-LANGUAGE |
| COMPAQ-LANGUAGE-DESCRIPTION | | | | COMPAQ-LANGUAGE |
| COMPAQ-OS-CODE | (PK) | | A string that uniquely | COMPAQ-OS |

-continued

| Attribute Name | PK | FK | Attribute Definition | Entity Usage |
|---|---|---|---|---|
| | | | identifies different versions of Compaq offered operating systems. | |
| COMPAQ-OS-DESCRIPTION | | | | COMPAQ-OS |
| CONFIGURATION-CODE-ID | (PK) | | | CONFIGURA-TION-CODE |
| DATA-COLLECTION-DATE | (PK) | | The date and time when the error was logged. | DATA-COL-LECTION |
| DATA-COLLECTION-ERRCODE | | | The type of error that occurred. | DATA-COL-LECTION |
| DATA-COLLECTION-SERIAL-NUMBER | (PK) | (FK) | Serial number of the unit where download occurred. | DATA-COL-LECTION |
| DATA-COLLECTION-SITE | | | A unique identifier assigned to a CCP Site. This value is retrieved from the system registry. | DATA-COL-LECTION |
| DIV-SITE-OPT-DEF-COMPANY-NAME | | | The company name used by default for operating system configuration. | DIVISION-SITE-OPTION |
| DIV-SITE-OPT-DEF-LANGUAGE | | (FK) | Default language selection | DIVISION-SITE-OPTION |
| DIV-SITE-OPT-DEF-OS-CODE | | (FK) | Default operating system selection | DIVISION-SITE-OPTION |
| DIV-SITE-OPT-DEF-REGION | | (FK) | Default region selection | DIVISION-SITE-OPTION |
| DIV-SITE-OPT-DEF-USER-NAME | | | The user name used by default for operating system configuration. | DIVISION-SITE-OPTION |
| DIV-SITE-OPT-FLAGS | | | Export and Test bits. | DIVISION-SITE-OPTION |
| DIVISION-CONTACT | | | | DIVISION |
| DIVISION-EMAIL | | | | DIVISION |
| DIVISION-ID | (PK) | (FK) | Division id for the site | DIVISION-SITE-OPTION |
| DIVISION-ID | (PK) | | An identification assigned to each Compaq division. | DIVISION |
| DIVISION-NAME | | | | DIVISION |
| DIVISION-PHONE | | | | DIVISION |
| DIVISION-SITE-ID | (PK) | (FK) | A unique identifier assigned to a CCP Site. | DIVISION-SITE-OPTION |
| IMAGE-CREATOR-SERIAL-NUMBER | | | | IMAGE |
| IMAGE-CUSTOMER | | | Name of the customer that the image belongs to. | IMAGE |
| IMAGE-CUSTOMER-ID | | | A twenty character user defined identifier for the customer. | IMAGE |
| IMAGE-DATE | | | The date that the image was created. | IMAGE |
| IMAGE-DESCRIPTION | | | The CCP Associates description assigned to the image. This is used during software selection. | IMAGE |
| IMAGE-DRIVE-SIZE | | | The size in MB of the drive the image was on. | IMAGE |
| IMAGE-IDENTIFIER | (PK) | | | IMAGE |
| LANGUAGE-DISPLAY-DESCRIPTION | | | The localized description text for the selected display language. | LOCALIZED- |
| LANGUAGE-DISPLAY-FLAGS | | | Translation changed | LOCALIZED-LANGUAGE |
| LANGUAGE-DISPLAY-CODE | (PK) | (FK) | The language version that Compaq language codes should be displayed in. | LOCALIZED-LANGUAGE |
| LANGUAGE-DISPLAY-SELECTION | (PK) | (FK) | The language code whose text should be displayed. | LOCALIZED-LANGUAGE |
| LOC-TAG-TYPE-EFFECTIVITY-DATE | (PK) | (FK) | | LOCALIZED-TAG-TYPE |
| LOC-TAG-TYPE-ID | (PK) | (FK) | | LOCALIZED-TAG-TYPE |
| LOCALIZED-TAG-DESCRIPTION | | | Localized string for the TAG description. | LOCALIZED-TAG |
| LOCALIZED-TAG-DIVISION-ID | (PK) | (FK) | Division identification for the localized tag description. | LOCALIZED-TAG |
| LOCALIZED-TAG- | (PK) | (FK) | | LOCALIZED- |

-continued

| Attribute Name | PK | FK | Attribute Definition | Entity Usage |
|---|---|---|---|---|
| EFFECTIVITY-DATE | | | | TAG |
| LOCALIZED-TAG-FLAGS | | | Export and Test bits. | LOCALIZED-TAG |
| LOCALIZED-TAG-LANGUAGE | (PK) | (FK) | | LOCALIZED-TAG |
| LOCALIZED-TAG-NAME | (PK) | (FK) | TAG name for this localized TAG description. | LOCALIZED-TAG |
| LOCALIZED-TAG-TYPE-DESCRIPTION | | | | LOCALIZED-TAG-TYPE |
| LOCALIZED-TAG-TYPE-FLAGS | | | Translation changed | LOCALIZED-TAG-TYPE |
| LOC_TAG_TYPE_LANGUAGE | (PK) | (FK) | | LOCALIZED-TAG-TYPE |
| MODEL-DIVISION-ID | (PK) | (FK) | | MODEL |
| MODEL-EFFECTIVITY-DATE | (PK) | | | MODEL |
| MODEL-FLAGS | | | Export and Test bits. | MODEL |
| MODEL-INSTALLOS | | | If TRUE then an operating system must be installed on the unit. If FALSE an operating system must not be installed. | MODEL |
| MODEL-PART-NUMBER | (PK) | (FK) | Base Model part number. | MODEL |
| NON-COMPAQ-CFG-SERIAL-NUMBER | (PK) | (FK) | | NON-COMPAQ-PART |
| NON-COMPAQ-DESCRIPTION | | | Free form description for the non-Compaq part. | NON-COMPAQ-PART |
| NON-COMPAQ-IDENTITY | (PK) | | | NON-COMPAQ-PART |
| NON-COMPAQ-MFG-NAME | | | Name of manufacturer for the part. | NON-COMPAQ-PART |
| NON-COMPAQ-SERIAL-NUMBER | | | Serial number of the non-Compaq part. | NON-COMPAQ-PART |
| NON-COMPAQ-SW-HW-IND | | | Categorizes the non-Compaq part as hardware or software | NON-COMPAQ-PART |
| NON-COMPAQ-UPC-NUMBER | | | Universal product code for the non-Compaq part. | NON-COMPAQ-PART |
| PART-DESCRIPTION | | | Description of the part that the part number references. | PART |
| PART-DIVISION-ID | | (FK) | | |
| PART-FLAGS | | | Export and Test bits. | PART |
| PART-NUMBER | (PK) | | A standard 6-3 Compaq part number. Same format used for software and hardware parts. | PART |
| PB-EFFECT-DATE | (PK) | | Date that the product BOM becomes active | PRODUCT-BOM |
| PB-MODEL-DIVISION-ID | (PK) | (FK) | Identifier of division that owns the product BOM. | PRODU,CT-BOM |
| PB-MODEL-EFFECT-DATE | (PK) | (FK) | Effectivity date of the model. | PRODUCT-BOM |
| PB-MODEL-PART-NUMBER | (PK) | (FK) | Base Model part number. | PRODUCT-BOM |
| PB-TAG-DIVISION-ID | (PK) | (FK) | Division that owns the TAG | PRODUCT-BOM |
| PB-TAG-EFFECT-DATE | (PK) | (FK) | Date that the TAG becomes effective | PRODUCT-BOM |
| PB-TAG-NAME | (PK) | (FK) | An identifier that is used instead of an actual hardware and software part number. | PRODUCT-BOM |
| PB_FLAGS | | | Export and Test bits. | PRODUCT-BOM |
| REGION-AUTOMATION-TEXT | (PK) | | String of characters used by CIA to select a region setting in an operating system. | REGION |
| REGION-DISPLAY-TEXT | | | String of characters displayed for a region setting selection. | REGION |
| REGION-LANGUAGE-CODE | (PK) | (FK) | Compaq language code.. | REGION |
| REGION-OS-CODE | (PK) | (FK) | Compaq operating system. | REGION |
| ROM-PART-DESCRIPTION | | | Description of the ROM version. | ROM-PART |

-continued

| Attribute Name | PK | FK | Attribute Definition | Entity Usage |
|---|---|---|---|---|
| ROM-PART-EFFECTIVITY-DATE | (PK) | | The date this ROM became effective. | ROM-PART |
| ROM-PART-FLAGS | | | Export and Test bits. | ROM-PART |
| ROM-PART-MODEL-DIVISION-ID | (PK) | (FK) | | ROM-PART |
| ROM-PART-MODEL-EFFECTIVITY-DATE | (PK) | (FK) | | ROM-PART |
| ROM-PART-MODEL-PART-NUMBER | (PK) | (FK) | | ROM-PART |
| ROM-PART-NUMBER | (PK) | (FK) | | ROM-PART |
| RULE-CATEGORY-TYPE | | | Should this rule be run during hardware or software selection. | CONFIGURATION-RULE |
| RULE-CONDITION | | | The kind of test or action being made: ANY EQUAL SET | CONFIGURATION-RULE |
| RULE-CONNECTOR | | | Is it a compound rule. Does it connect to another rule? | CONFIGURATION-RULE |
| RULE-FLAGS | | | Export and Test bits. | CONFIGURATION-RULE |
| RULE-MODEL-DIVISION-ID | (PK) | (FK) | The division that owns the base model part number | CONFIGURATION-RULE |
| RULE-MODEL-EFFECT-DATE | (PK) | (FK) | The effectivity date for the base model part number. | CONFIGURATION-RULE |
| RULE-MODEL-PART-NUMBER | (PK) | (FK) | The part number of the base model unit. | CONFIGURATION-RULE |
| RULE-NUMBER | (PK) | | Position in the Rule list. | CONFIGURATION-RULE |
| RULE-OUT-TAG-DIVISION-ID | | (FK) | | CONFIGURATION-RULE |
| RULE-OUT-TAG-EFFECT-DATE | | (FK) | | CONFIGURATION-RULE |
| RULE-OUT-TAG-NAME | | (FK) | | CONFIGURATION-RULE |
| RULE-TAG-TYPE-EFFECTIVITY-DATE | | (FK) | | CONFIGURATION-RULE |
| RULE-TAG-TYPE-ID | | (FK) | The TAG-TYPE id for the TAG values to examine. | CONFIGURATION-RULE |
| RULE-VALUE-TAG-DIVISION-ID | | (FK) | | CONFIGURATION-RULE |
| RULE-VALUE-TAG-EFFECT-DATE | | (FK) | | CONFIGURATION-RULE |
| RULE-VALUE-TAG-NAME | | (FK) | | CONFIGURATION-RULE |
| SELECTED-TAG-DIVISION-ID | (PK) | | Division identifier that owns the TAG. | SELECTED-TAG |
| SELECTED-TAG-EFFECT-DATE | (PK) | | The date that this TAG became effective. | SELECTED-TAG |
| SELECTED-TAG-NAME | (PK) | | An identifier that is used instead of an actual hardware or software part number. The TAG is meant to reduce maintenance in the system when an actual part number changes. | SELECTED-TAG |
| SELECTED-TAG-QUANTITY | | | The number of the same TAGs selected. For example multiple memory modules with the same part number. | SELECTED-TAG |
| SELECTED-TAG-SERIAL-NUMBER | (PK) | (FK) | Configuration where TAG is used. | SELECTED-TAG |
| SITE-ADDRESS | | | Address of CCP site. | SITE |
| SITE-CITY | | | City where CCP site is located. | SITE |
| SITE-CONTACT | | | Name of contact person at site. | SITE |
| SITE-COUNTRYCODE | | | This field identifies the country where the site is located. | SITE |
| SITE-DISPLAY-LANGUAGE | | (FK) | The language version that is displayed on all CCP programs. | SITE |
| SITE-EMAIL | | | E-mail address for CCP site. | SITE |
| SITE-FAX | | | FAX telephone number for | SITE |

-continued

| Attribute Name | PK | FK | Attribute Definition | Entity Usage |
|---|---|---|---|---|
| | | | site. | |
| SITE-ID | (PK) | | A unique identifier assigned to a CCP Site. | SITE |
| SITE-IMAGE-NUMBER | | | The current identifier in a block of identifiers that are assigned to images generated on site. | SITE |
| SITE-NAME | | | Name of the CCP Site. | SITE |
| SITE-PHONE | | | Phone number for CCP site. | SITE |
| SITE-STATE | | | State where CCP site is located. | SITE |
| SITE-ZIPCODE | | | Zipcode of CCP site | SITE |
| TAG-CATEGORY | | | Hardware or software. | TAG |
| TAG-DIVISION-ID | (PK) | (FK) | Division identifier that owns the TAG. | TAG |
| TAG-EFFECTIVITY-DATE | (PK) | | The date that this TAG will be effective. | TAG |
| TAG-FLAGS | | | Export and Test bits. | TAG |
| TAG-HARDWARE-ON-BOARD | | | The hardware component is located on the mother board of the model-1 base system. True or False. | TAG |
| TAG-NAME | (PK) | | An identifier that is used instead of an actual hardware or software part number. The TAG is meant to reduce maintenance in the system when an actual part number changes. | TAG |
| TAG-ORDER | | | The copy order for this software part number. | TAG |
| TAG-PART-NUMBER | | (FK) | A standard 6-3 Compaq part number. Same format used for software and hardware parts. | TAG |
| TAG-SW-LANGUAGE-REQUIREMENT | | | A two-character code defined by drawing 130–955. | TAG |
| TAG-SW-OS-REQUIREMENT | | | A string that uniquely identifies different versions of Compaq offered operating systems. | TAG |
| TAG-TYPE-DESCRIPTOR | | | The EDI 856 descriptor. Z???E string. | TAG-TYPE |
| TAG-TYPE-DISPLAY-AS | | | Will the values for this type be displayed as buttons or in a drop-down list. | TAG-TYPE |
| TAG-TYPE-DISPLAY-ORDER | | | A numeric value that determines the order that this tag is displayed on the software selection dialog. The display is ordered from the top to the bottom. | TAG-TYPE |
| TAG-TYPE-EFFECTIVITY-DATE | | (FK) | | TAG |
| TAG-TYPE-EFFECTIVITY-DATE | (PK) | | The date that the TAG-TYPE becomes effective | TAG-TYPE |
| TAG-TYPE-ENTRY-REQUIRED | | | Does the user have to make a selection? True or False. | TAG-TYPE |
| TAG-TYPE-ID | | (FK) | | TAG |
| TAG-TYPE-ID | (PK) | | The identification for this type: MEMORY HARD-DISK APPLICATION . . . | TAG-TYPE |
| TAG-TYPE-SELECTABLE | | | Is the part number tag selectable? No; Single selectable; Multiple selectable. | TAG-TYPE |
| TAG-TYPE-SHOW | | | Should the type description be displayed? True or False. | TAG-TYPE |
| USER-DIVISION-ID | | (FK) | | USER_DIVISION |
| USER_NAME | (PK) | | | USER_DIVISION |

Introduction and Replication of the Rules Base

Figure 6:
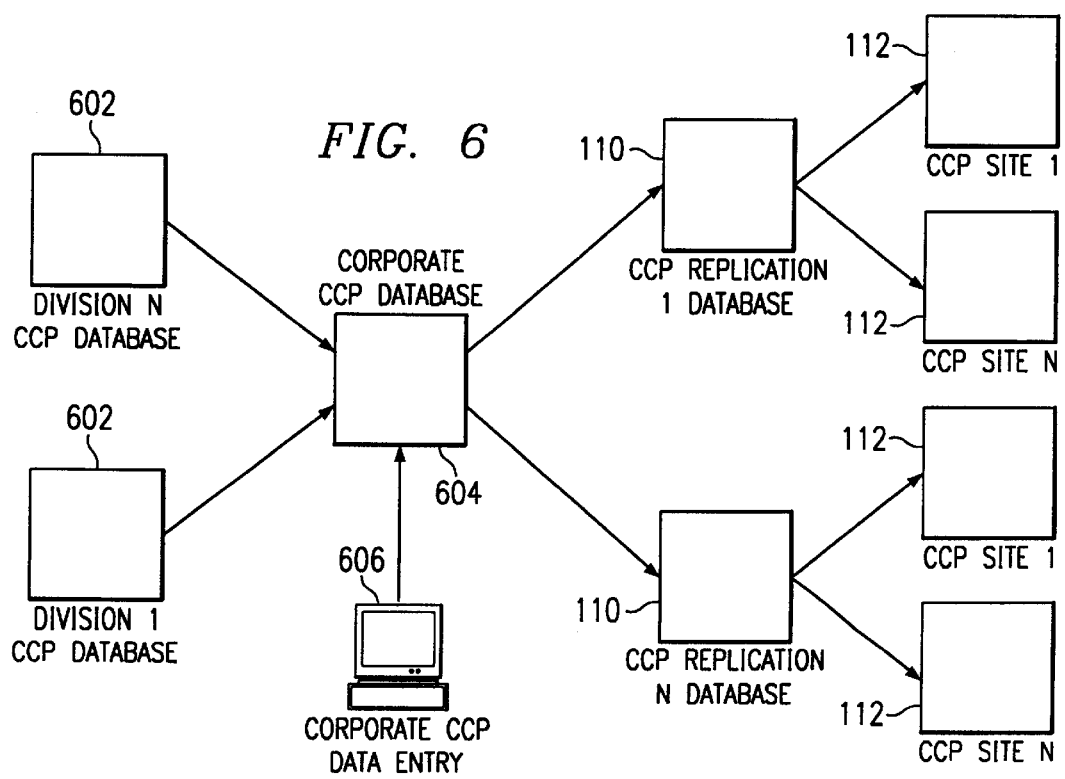
FIG. 6 shows a block diagram of the software configuration information data flow between manufacturing headquarters and a remote manufacturing facility.

When software is released into the PRISM system a set of rules which defines the conditions under which the software is to be installed is also released. The ERDs above describe the format in which the rules are stored. FIG. 6 illustrates the method by which the rules are released by various software engineering groups into the rules base network.

The database relies on its DBMS for transactional replication of the rules base. Separate software engineering groups 102 release software tags and their associated rules into an isolated CCP database for their particular group 602. Any change to the database creates a transaction record. The DBMSs running on the isolated databases 602 uses this transaction log to replicate the change to the corporate CCP database 604. The corporate CCP database 604 is a master database of all the tags and rules released by various software engineering groups of the manufacturer. Any corporate-based data or changes that need to occur to the corporate CCP database 604 are made separate from the division entries 602 at 606. From this master database, the DBMS replicates the changes, based on the transaction log, to CCP databases at remote manufacturing sites 112.

Software Configurator

The software configurator is executed on a computer connected to a network with access to the CCP server and database. It is used to create a configuration file for each computer or hard drive. The file contains information concerning the installed hardware components, including the model number of the machine being configured, the operating system, and various software packages that will be installed on the machine. The software configurator also allows a language preference to be designated. If a software package is available in the designated language, it is installed instead of an English language version.

To create a configuration file for a particular machine, the serial number of the machine is scanned or typed into the application. The model part number must also be selected for the machine.

The serial and part numbers of the remaining hardware components that will constitute the machine must then be entered. A language preference is then selected.

The language preference determines what operating systems are available for selection. Through a call to the CCP database which contains information concerning the software available for download, a selection list for operating systems is built and displayed. Once selected, the operating system choice along with the language preference determine what software packages may be selected. This list is also created via a call to the CCP database.

Once all hardware and software have been selected, a formatted file is created which describes the machine to be configured and the software selections made. This file can be transmitted to the CCP server for parsing and rules evaluation. The software configurator can retain the file, retrieve the rules set necessary for evaluation of the selections, and create the hardware and software part number list necessary for entry into the CCP database.

Figure 4:
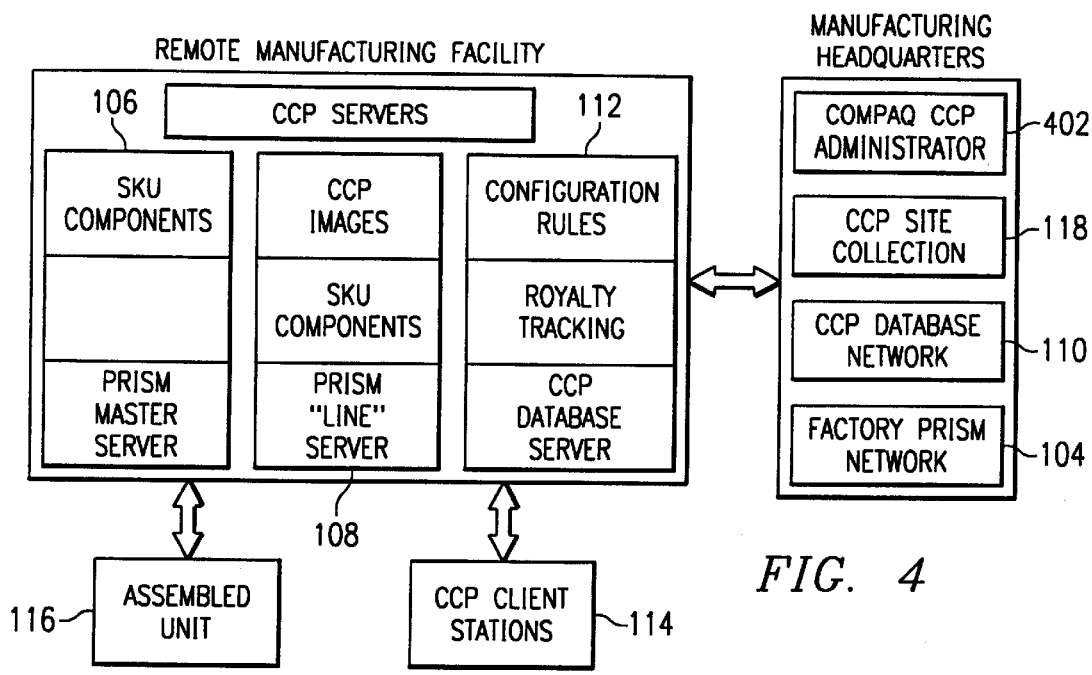
FIG. 4 shows a block diagram of the data flow of the software pre-installation system.

FIG. 4 depicts a data flow diagram which represents the connectivity between the CCP database, the PRISM database, the CCP Client Station, and the assembled unit. Also shown is the connectivity between the CCP and PRISM databases and the manufacturing headquarters or data collection and distribution point.

Factory PRISM Server A repository for SKU Components.

SKU Components Software deliverables used during the software download process. The deliverables are configured on the assembled unit.

Local PRISM Server A repository for locally generated hard disk images.

CCP Images Fully configured system images are captured and stored in the CCP database for use when building additional copies of the same computer model.

CCP Database Server The physical server that contains the various databases required supporting software tracking and downloading at the CCP site. The CCP database maintains information about systems built and the software installed on those systems Royalty Tracking A segment of the CCP database responsible for counting the software deliverables installed by a CCP.

Configuration Rules A segment of the CCP database responsible for storing the configuration rules for hardware and software components.

Assembled Unit The computer system assembled from supplied parts, and built at the CCP site.

CCP Client Stations One or more stations at the CCP site that executes the program used to record information about a assembled unit.

Software Configurator Overview

The software configurator is used by the CCP Client Program to identify the SKU Components required for the assembled unit. The configuration process is driven from a description of each base model called a PRODUCT BOM.

The Product Bill-of-Materials contains two types of objects. The first is the TAG. The TAG object describes a software deliverable. The software deliverable can be a language version of an operating system, an application, or an operating system driver. Each TAG references an actual software part number. More than one TAG may reference the same software part number.

Product Bill-of-Materials

The TAG is used in the Product BOM instead of the actual part number to simplify maintenance operations. A TAG may be used in any number of Product BOMs, but if the software part number changes for the TAG, then only the association between the TAG and part number need change. No maintenance is required in the Product BOM.

The second type of object found in the Product BOM is rules. Rules are used to show dependencies between two TAGs, whether they are software or hardware. Rules determine the actual list of software part numbers that are produced from the software selection process.

The CCP Client Program must construct the software selection dialog dynamically. Since each Product BOM is under frequent revision, and each Product BOM can contain different combinations of software and hardware, the selection dialog is built from the software TAGs in the Product BOM at the time the selection dialog displays.

A list of TAGs is built from the hardware part numbers scanned from the assembled unit sub-assemblies. The part number associated with each hardware TAG in the Product BOM for the unit is compared to the part numbers scanned and those that match are saved. This becomes the list of TAGs used to display the selected hardware sub-assembly descriptions.

All of the software TAGs are read from the base hardware model Product BOM. The TAGs are arranged by type. For example, all APPLICATION types are grouped together. Within each group the TAGs are also arranged by language and operating system requirements.

The selected hardware TAGs and the software TAGs from the Product BOM are combined and sorted by the Display Order field for each TAG type.

The TAG types are used to build the display. The type text is used as the descriptive text for a selection, or a group of selections. For example, within the APPLICATION type there may be two packages: Powerpoint for Windows 95 and Word 97. For each TAG type there are properties that define if the type should be displayed, if it can be changed and where it will display on the Software Selection dialog.

When the software selection is complete, the rules will be evaluated to create a list of software part numbers. The software download tools need the software part numbers as keys to the PRISM database. Each software part number references a single SKU Component that must be copied to the assembled unit hard drive.

Rules

Rules are a simple method for establishing dependencies between hardware and software TAGs, or between two TAGs. A Rule table is created for each Product BOM. The rules describe the software part numbers that should be used for each possible configuration of the Product BOM. The Rule table is composed of the TAG-Type, Condition, Value, Connector, and TAG name fields.

Part Number Ordering

The Compaq Installation Assistant installs SKU Components in the order that they are found on the hard drive. In order to affect the sequence of the installations, the order in which they are copied to the hard drive must be affected. This will be done in the CCP Software Download System by assigning a numeric value to each TAG. This value is passed on to the software download tools through the SFDM Emulator interface.

The ordering builds a table of values for the different SKU Components. Categories of components usually are contained within a narrow range of values and categories are separated by a larger division. Selected components are sorted by the order value.

CCP Client Program

CCP Client is a Windows 95/NT application that can be used by a Channel Configuration Partner to define system configurations built at their site. A system configuration is needed to invoke the software download process from the PRISM system.

Configuration information may be specified through CCP Client, or imported from external files. In both cases, the user of the program must logon to the CCP Software Download System to begin the definition and to perform any maintenance on an existing configuration.

The CCP Client Program defines an assembled unit's configuration for the CCP Software Download System. The configuration must be fully specified before a software download can occur for the unit. A configuration includes: Compaq hardware, Compaq software, the product identification (COA) number for the Microsoft Operating system used, user registration information, and any non-Compaq hardware and software that is added to the unit.

The user may select three options: define a new configuration, open an existing configuration, or display status on existing configurations. Alternatively, the user may elect to Cancel" out of the dialog and make selections through the main menu bar.

New Configuration

Selecting the New Configuration option prompts the user to create a configuration from input into CCP Client or via an external file.

Figures 7A, 7B:
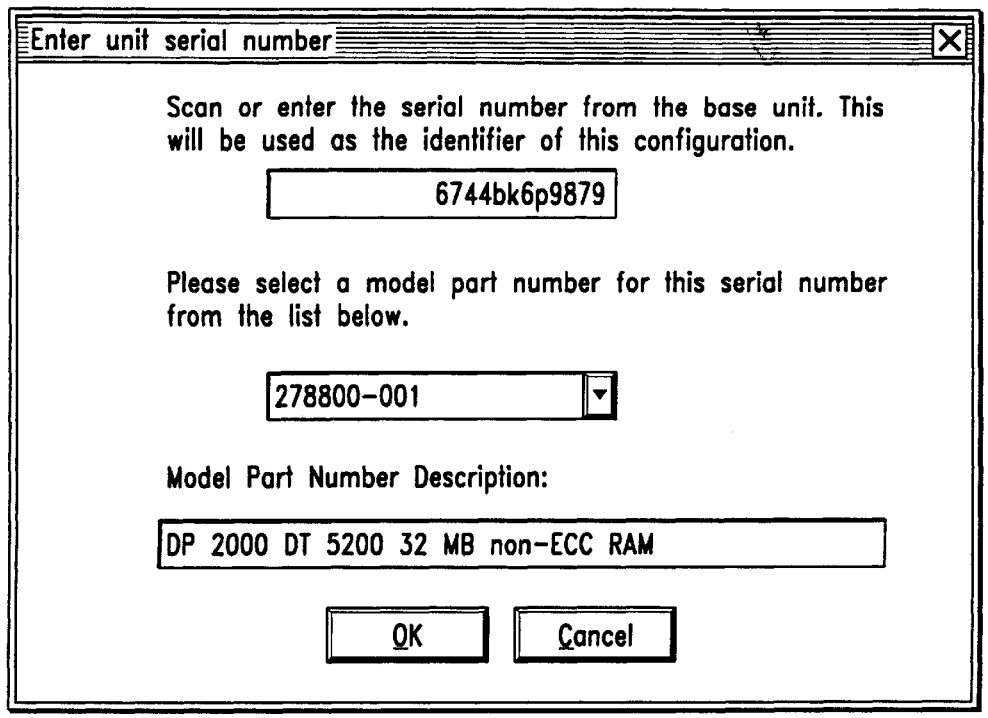
Figure 8A:
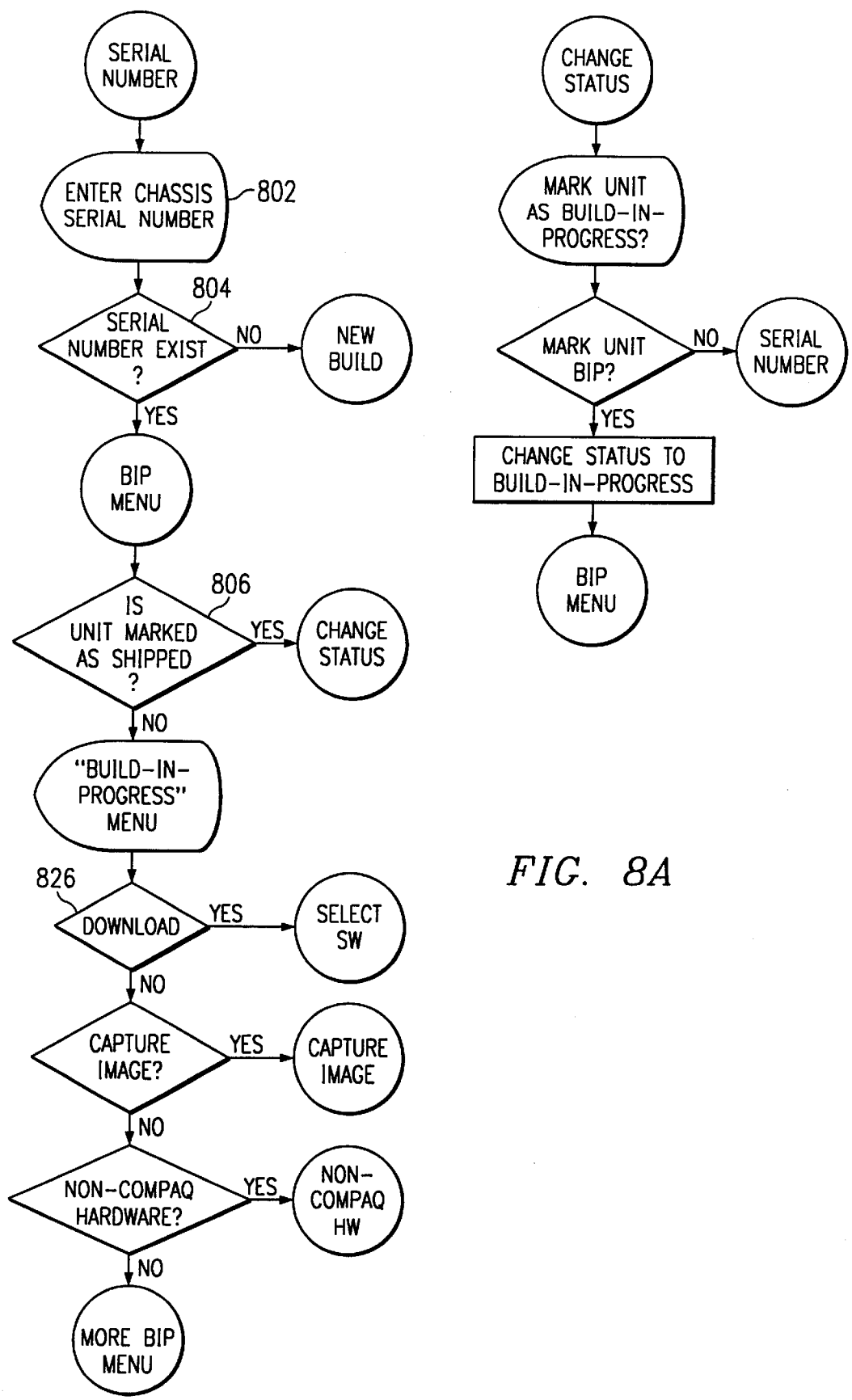
FIGS. 8A–F show a flow chart of the hardware assembly, software selection and installation process.
Figure 8B:
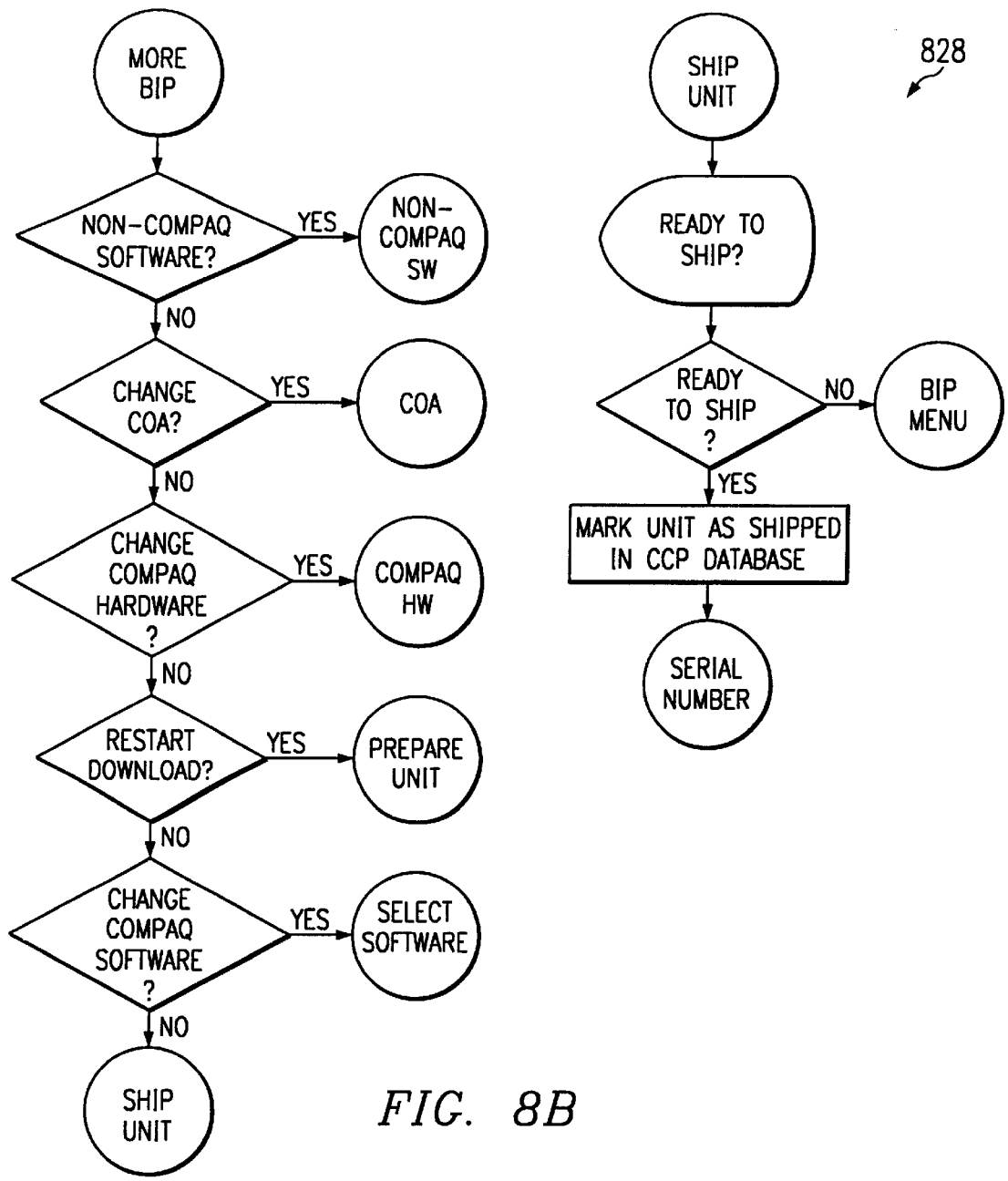
Figure 8C:
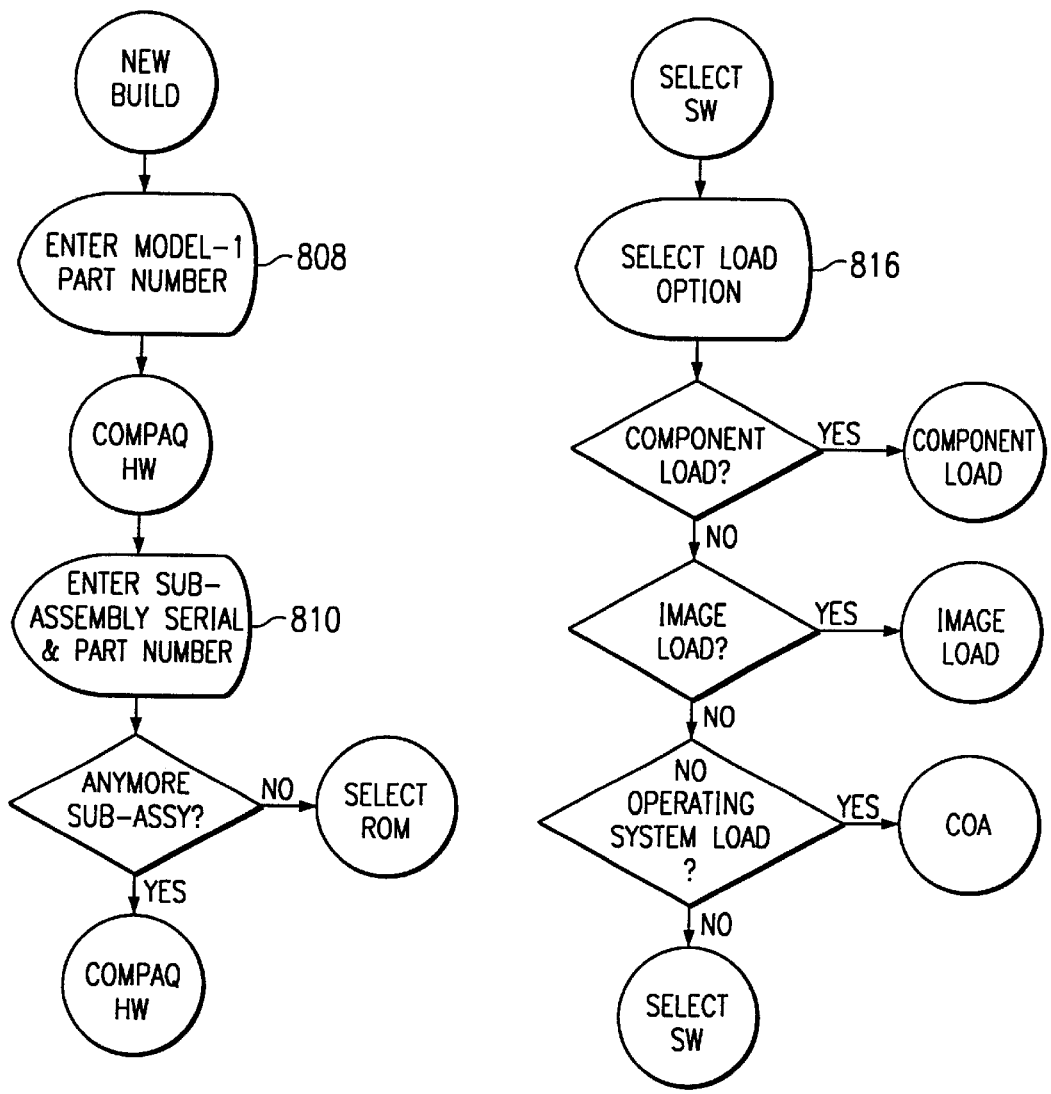
Figures 8D, 8E:
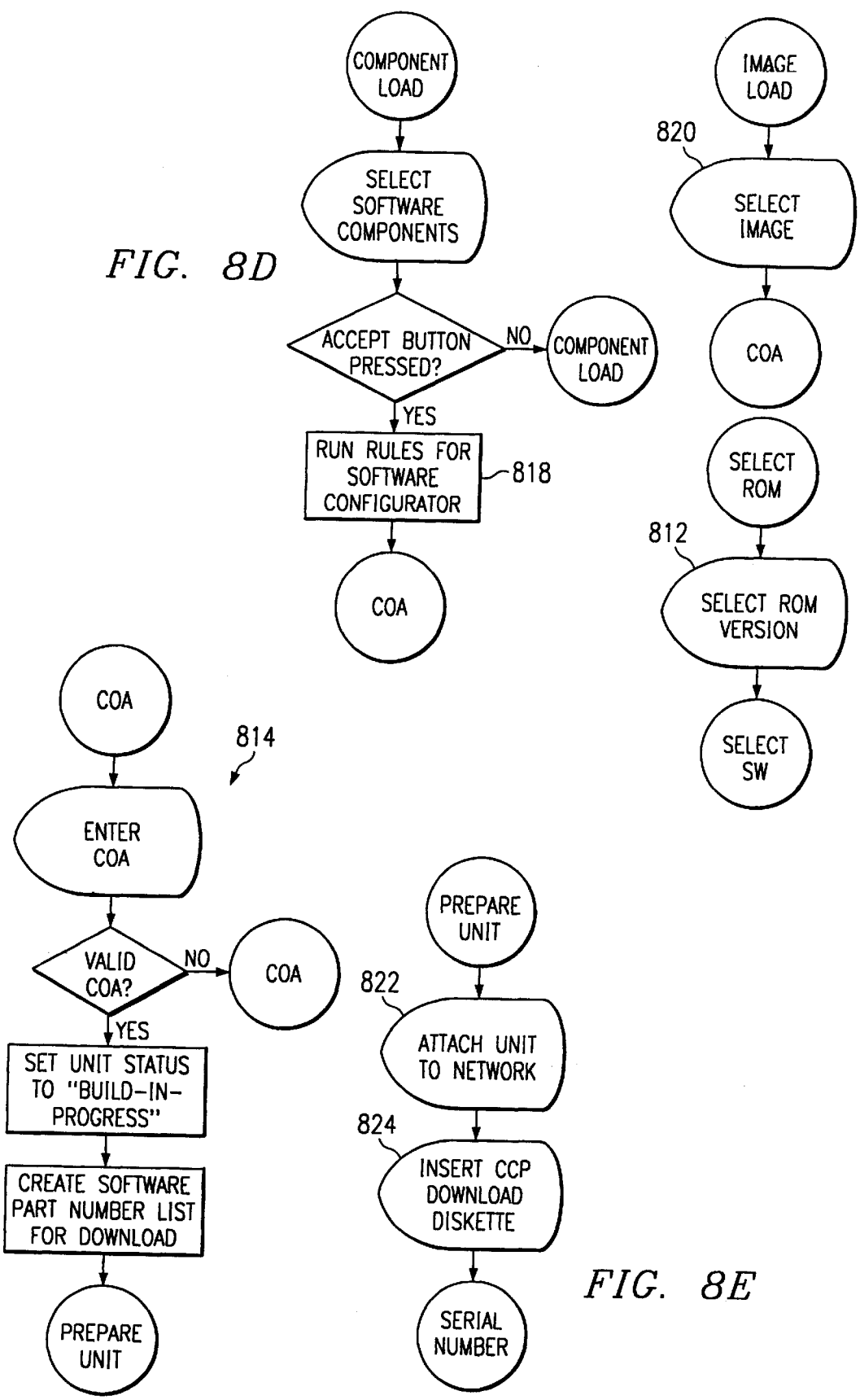
Figure 8F:
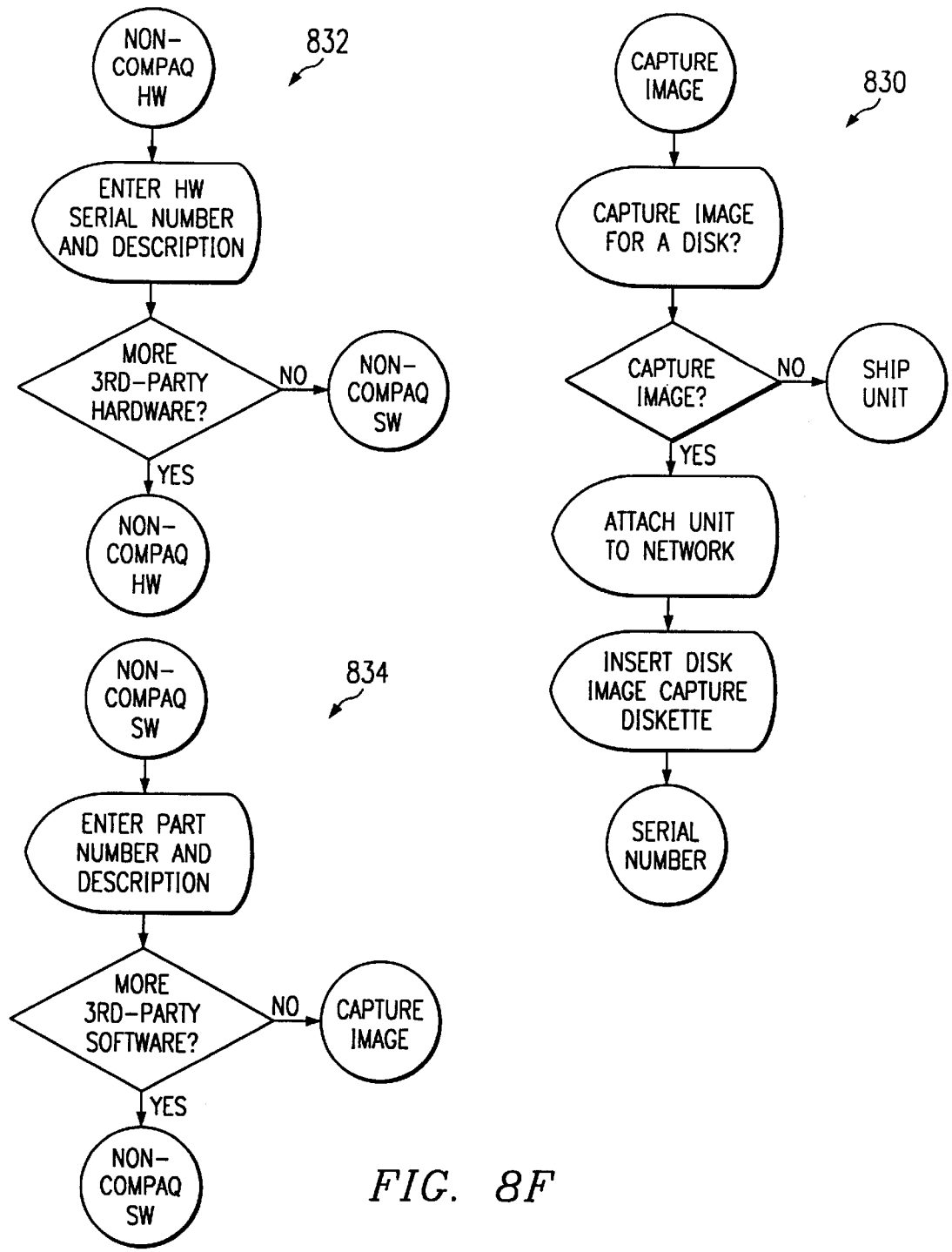

If Create from file is selected, a dialog box like that depicted in FIG. 7A will appear. The user will be prompted for the file location and name. Manual entry begins with capturing the serial number for the unit and selecting the model part number for the unit.

The Serial Number determines the list of valid model part numbers for the unit. It may be scanned or entered manually. The serial number must be twelve characters and the edit field in the dialog will insure that the correct number of characters is entered.

The serial number is used to identify the configuration in the CCP system. The Model Part Number Description reflects the selected model part number.

Compaq Hardware Definition

Once the appropriate information is entered into the new configuration dialog box depicted in FIG. 7A, a dialog box like that depicted in FIG. 7B appears to collect information on the manufacturer's hardware sub-assemblies that will be installed. The Compaq Hardware definition includes the hard drive, additional memory modules, cd-rom drive, modems, and any other Compaq supplied option. The serial number and part number must be entered for all Compaq hardware options. Error checking is in place to ensure that only valid hardware options can be selected for a particular model number. As the options are entered they are stored in the window displayed above with a description of the part. This description can be used by the user as a visual reenforcer that the correct item is being recorded.

There is no limit to the number of parts that can be entered. When all options have been identified, the user will complete the dialog by selecting the Next button. Selecting Next will advance to the Compaq software specification.

Compaq Software Definition

There are two methods for defining Compaq software:

The Components option allows individual specification of Compaq software options, and will most likely be used for individual orders. The Images option allows selection of a historical download. This option will most likely be used for large volume orders, or for reoccurring orders for identical hardware.

The components dialog, depicted in FIG. 7C, is constructed from information supplied in the Compaq hardware dialog, and from information in the CCP database that defines the valid software choices for the type of system being built. This information is combined to create selections for the language version of software, operating system, and applications. The Language version selected will determine the Operating System selections available, and the language and operating system will determine the Applications available. Software drivers for the defined hardware are selected automatically once the language and operating system have been selected. These are not currently displayed.

Software and Hardware Dependencies

Some software selections are performed for the CCP Build Associate. This selection is controlled through a set of rules. These rules are written for each base model system by the product division. The rules describe hardware and software dependencies, and software and software dependencies. For example, video hardware typically requires specific versions based on the language version of the operating system choice. In this case, a rule would be written that would select the appropriate driver based on the user's language and operating system selection. Selecting the Next button completes the software selection dialog.

Certificate of Authenticity

Each operating system requires a Certificate of Authenticity number, or sometimes called a product identifier.

The COA dialog requires that the user enter the number in a specific sequence. The number contains self-checking information that is used to verify that the numbers entered are correct. An incorrect number will cause an error dialog to display, requiring the user to re-enter the number. A valid COA must be entered before any additional information can be entered.

Following the COA dialog is an end-user registration and preferences dialog. This requests a user preference for the operating system regional settings, end-user name and company name. Each of these selections defaults automatically to a site defined set of values. The CCP Build Associate may simply press the Next button to accept the default values.

Saving Information for Download Process

At this point, all Compaq information has been defined. The CCP Build Associate may change any of the information already entered, or continue on to enter optional non-Compaq information. By selecting Next, the user is given the option to specify non-Compaq hardware.

The configuration should now be saved. Since the Compaq information has been fully defined, the system is now enabled for software download.

List Translation and the Rules Database

FIG. 17 depicts a flow chart of the process which converts hardware and software selections into a configuration file which is used to download the appropriate software and diagnostics onto the machine. A process running on the CCP server receives the formatted file transmitted by the software configurator program (Step 1702). The file is parsed (Step 1704) and, if valid information is received, the descriptive information for each hardware or software component is converted into a tag and placed in a selected tag list (Step 1706). The tags associate the components with particular rules in the database. Each hardware component entry is also converted into a part number and stored in a configuration table by machine serial number which describes the machine "as-built" (Step 1708).

Rules which determine the appropriate software components to be installed based on hardware tags, language preference, and selected software tags are stored in the CCP database. A condition array is built by extracting the rules which apply to the selected tag list (Step 1710). The process evaluates each rule in the condition array based on the hardware, language preference, and operating system selections made (Step 1712). If the rule evaluates to true, the tag of any software component designated by the rule to be downloaded is stored in a list Once all the rules have been evaluated without error, the list of tags is converted, by reference to a CCP database table, into part numbers which are stored in the configuration table by machine serial number (Step 1714). The part numbers are accessed by the download process when the machine is ready to be for pre-installation.

Import Files

The configuration created by the CCP Client Program can also be created manually using a text editor or by a more simple software process. Each text file created instructs the configuration and download system in a different operation.

The CCP File Import Program is used to define "As built" configurations in the CCP Software Download System and to set configuration status for units that have shipped and units that are sent back to the manufacturer. This program runs unattended on the CCP server.

The CCP Import Program accepts specially formatted text files as the means of defining the "as built" configurations. These text files use commands to identify the unit serial number of the system being configured, manufacturer hardware and software, a language version and operating system choice, the operating system Certificate of Authenticity (COA) number, user preference information, and third-party hardware and software options. This information is recorded in several SQL tables in the CCP database.

The program is organized as a main program (console application), a dynamic link library (DLL) with the process code, and one or more resource-only dynamic link libraries used to support messages in multiple languages. Other programs, such as the CCP Client utilize the process DLL to create configurations in the CCP database.

The main program is responsible for searching a shared server directory for configuration files. When a file is found, a call is made to the process DLL with the name of the file. The process will return a pass or fail indication. If the configuration request fails, a text file is created with the error code and message in it. These messages are localized based on the setting of the default language for the server. The error messages are written to a file with the same name as the import file, but with a different extension.

The process DLL begins execution by identifying the correct resource DLL to use and has that DLL load. Any warning, informative, or error messages written to the error file for the configuration are localized to the site.

At this time, connectivity is established to the CCP database. All table accesses are made through this connection. A program log file may also be created if a command line parameter has been specified. The program log will record SQL commands issued, any database error messages returned, and any program level error messages.

After the initialization phase, the process DLL begins by reading the import configuration file and storing the contents in memory objects. These objects are accessed during the processing of the configuration by other elements in the process DLL.

Configuration rules are checked as the contents of the file are read. Parse error messages will result if the syntax of a command is violated. The error messages are written to the error file for that configuration, and the processing of that file is terminated. Control returns to the main program. The next configuration file is passed to the process DLL.

Six different build and status change scenarios are supported: Build a new system, update an existing system, build a no operating system configuration, update a no operating system configuration, set the ship status for a configuration, and setting the dead-on-arrival status for a configuration.

The build and update scenarios begin by mapping the four character configuration code embedded in the unit serial number to a base model part number in the PART table. The part number is used to locate a model record in the MODEL table. This record contains information about the software load options available for the unit.

A test is made initially to determine if the configuration already exists. If it does, additional checks are performed to determine its ship status, dead-on-arrival status, and operating system load requirements.

Some models, as it will be explained later in this document, can not receive any user software. This includes the operating system, and some must have the user software downloaded to the unit. If the model being configured is a No Operating System model, the New and Update scenarios will be described in another section in this document.

Building a New System

This is the most involved of all the configuration scenarios. A full configuration is created from the parsed contents of the import file. This scenario is executed when a configuration with the same unit serial number does not exist.

A new build configuration record is created and initialized to default values. For date fields, a NULL is used. The unit serial number and the part number associated with the base model unit is saved in the build configuration record.

Next, the site identifier for the CCP site is read from a SITE.INI file, e.g., D:\FSDASH\CCP\SITE.INI. This value is written to the build configuration record. An error occurs if the SITE.INI file can not be found.

The language and operating system version is checked next. These values must be specified for a component software load, but they are ignored for an image load.

If an image load is specified, the image identifier is used to retrieve the record from the IMAGE table. The creator's unit serial number is part of the IMAGE record. This serial number is used to read the original configuration record, and the language and operating system values in that configuration are copied to the new configuration. If the image identifier is invalid, an error is written to the error file for the configuration and the build phase is terminated. If the original configuration record is not found, the language and operating system values are left blank, and the build phase continues.

If the software is loaded from components, the language and operating system versions are retrieved from the import file values. If these are not specified, an error is written to the error file for the configuration and the build phase is terminated.

The values are then checked against the Product BOM for the unit to insure that they are valid selections. If the combination is not supported by the model, an error is written to the error file for the configuration and the build phase is terminated. If the values are valid, they are written to the build configuration record User preferences and registration information is optional in the import file. If it is not specified, the values in the DIVISION_SITE_OPTIONS table are used. If these values cannot be read, an error is written to the error file for the configuration and the build phase is terminated.

The regional settings value from the import file is checked against the valid values in the REGION table. If the setting is not correct for the language—operating system selection, an error is written to the error file for the configuration and the build phase is terminated. The valid values are copied to the build configuration record.

If a Microsoft operating system is loaded on a system, then a Certificate of Authenticity number is required. If one has not been specified in the import file, an error is written to the error file for the configuration and the build phase is terminated.

Each COA is validated against a Microsoft-supplied algorithm. If the number entered is invalid, an error is written to the error file for the configuration and the build phase is terminated.

If a COA is supplied, and if it is valid, then an additional check is made in the CCP database to insure that it is not currently assigned to another configuration. If another configuration is currently using the COA, an error is written to the error file for the configuration and the build phase is terminated. The valid COA is written to the build configuration record.

Due to the referential integrity checks in place between the CONFIGURATION table and its reference table, the partial build configuration record is written at this time.

At this time the core information for a configuration has been processed. The remaining information deals with the manufacturer's hardware and software and third-party hardware and software.

Multiple manufacturer hardware options may be specified in a import file. These include, but are not limited to, a hard disk, additional memory, and a CD-ROM. Options are identified by their part numbers. The part number must exist in the PART table. If it doesn't, an error is written to the error file for the configuration and the build phase is terminated.

The software configuration rules discussed later in this section are dependent on TAGs. These TAGs are stored in the SELECTED_TAG table. The hardware option part number must be converted to its associated TAG. A search is performed in the TAG table for a TAG with an option part number. If one is not found, an error is written to the error file for the configuration and the build phase is terminated.

Once a TAG is found, the PRODUCT BOM table is checked to insure that the hardware option identified by the TAG is valid for the base model. If the hardware option TAG is not found in the PRODUCT_BOM table, an error is written to the error file for the configuration and the build phase is terminated.

A valid hardware option TAG is written to the SELECTED_TAG table. In addition, entries are added to the CONFIGURATION_PART and CONFIGURATION SERIAL tables if both a part number and serial number for the option is available. If only a part number is specified, then nothing is written to the CONFIGURATION_SERIAL table. If an error occurs while writing to either of these tables, an error is written to the error file for the configuration and the build phase is terminated.

This process of validation and adding continues until all manufacturer hardware options have been processed.

The software load option is processed next. Two types of loads can be specified—components or image. Unit builds, where no software is loaded, is discussed later. Components and image load may not be specified at the same time. If they are, an error is written to the error file for the configuration and the build phase is terminated.

If an image load is specified, the image identifier is recorded in the build configuration record. This will be retrieved later during the software configuration rules evaluation phase and placed in the CONFIGURATION_PART table for use by the software download tools.

If a software load is required a process similar to the manufacturer hardware process is required. Manufacturer software options are identified by name instead of part number. These names are the same as the TAG names for the software deliverable. The valid software choices for a base model are available through the PRODUCT BOM Viewer, which is part of the CCP Client program.

The application description in the import file is used to locate the TAG with the same name. If a TAG cannot be found, an error is written to the error file for the configuration and the build phase is terminated.

Like manufacturer hardware, each software option must be part of the PRODUCT BOM. If it isn't, an error is written to the error file for the configuration and the build phase is terminated. A valid TAG is written to the SELECTED_TAG table. These are used during the software configuration rules phase to create a list of software part numbers required during download.

Once all the manufacturer hardware and software has been processed, the third-party hardware and software options are copied to the configuration. The contents of this data are fairly freeform and no checks are performed on the data supplied. The information is written to the NON_COMPAQ_PART table. It is transmitted back to the manufacturer during the export phase for evaluation.

At this time the contents of the import file have been processed. The remaining step must create a list of software SKU Components needed during the software download phase. These components are identified by software part numbers. The components are stored in the PRISM database. The software part numbers are selected as a result of evaluating a set of rules. The rules look at the hardware options selected for the base model and pick the appropriate software drivers and support deliverables. In addition, any applications specified are converted to a software part number. The resulting list of software part numbers is inserted in the CONFIGURATION_PART table.

The software download status is changed to ready to download and all stored changes are written to the CCP database. This completes the build configuration phase.

Updating an Existing Configuration

The update scenario is executed when the configuration exists. The purpose of this scenario is to change some portion of the configuration. Everything may be changed except for the unit serial number, which is the identifier for the configuration.

Before any changes are allowed, the software download status is checked. If the status is complete, download started, or if the configuration is locked, then any changes are rejected and an error message is written to the error file for the configuration. The Program Messages section describes each of these messages.

It is assumed that when a change occurs to an existing full configuration, that the import file will contain the complete description of the system, instead of just the changes being made to the configuration. Before the new import file changes are made, the entries in the NON_COMPAQ_PART, SELECTED_TAG, CONFIGURATION_PART, and CONFIGURATION_SERIAL tables are purged of all entries for the unit serial number. There are several partial configuration options described in the following sections.

The configuration sent field is also cleared at this time so that a new copy of the configuration is sent.

The remainder of the update proceeds like a new configuration build.

Building a New "No Operating System" Configuration

Most base model's require that an operating system be loaded, but there exists a capability to designate that some models will not receive an operating system. This does not mean that the unit will not receive software. The hidden (system) partition still requires that diagnostics be loaded.

The process is similar to a full build with the exception that language and operating system version, COA, and manufacturer software specifications are ignored in the import file. Manufacturer hardware, third-party hardware, and software entries are captured and written for the configuration.

Updating a "No Operating System" Configuration

This update makes many of the same assumptions that the full build update does. It will also purge the reference tables before processing the updated definition from the import file.

Setting SHIP Status

A special scenario exists where a configuration exists, software download is complete, and all information has been specified. The unit is shipped from the CCP site. The partner needs to tell us this by submitting an import file with two records. One is the MOD1SN and the other is a SHIP record. This file will set the ship date for the configuration to the date specified in the SHIP record.

Errors can occur, and processing will terminate, if: the configuration identified in the MOD1SN record does not exist, more records are present than the MOD1SN and SHIP entries, the download status is not complete, the configuration is not locked, the configuration has already shipped, there is no ship date specified in the SHIP record, the build date is after the ship date. If there is no errors, the ship date is written to the configuration record, the download status is changed to CONFIGURATION LOCKED, and the changes are written to the CCP database.

Setting DOA Status

If a base model has a hardware failure, or has missing components, and must be returned to the manufacturer after a configuration has been created in the CCP database, the unit must be marked as dead-on-arrival. This will also clear the COA number so it may be used with another configuration.

This will also change the download status to incomplete, forcing a new software download if the unit should be repaired.

Configuration File Parser

The import configuration file parser reads the contents of the file and disassembles each line into a recognizable object. These objects are accessed during the configuration build phase. The module opens the file in text mode so that each read retrieves a single line. If the open fails, an error message is written to the configuration error file and the parse phase is terminated. Each non-blank line is composed of a record identifier, which describes the type of data contained on the line, and one or more parameters for the identifier. Each entry on a line is separated by a comma. The disassembly operation first locates the record identifier in an array of valid types. If the identifier is not found, an error message is written to the configuration error file and the parse phase is terminated.

The parameters are stored in internal objects. When a line has been completely disassembled, tests are performed to verify that the correct number of parameters have been given for the record identifier. If too many parameters have been specified, or if too few parameters are given, an error message is written to the configuration error file and the parse phase is terminated.

When all records have been record from the file, a check is made to insure that the file had at least one record. If no records were read, an error message is written to the configuration error file and the parse phase is terminated. The last task before the parse phase is complete is to build lists for manufacturer hardware, software, third-party hardware, and third-party software entries. These will be returned one at a time during the build phase. These lists store the position that the object has in the object array. If there are more than 50 objects in any category, an error message is written to the configuration error file and the parse phase is terminated.

Several methods are defined for retrieving the parsed information. Each of these will return TRUE if an entry is available, or FALSE if no entries are found.

Download of software cannot take place without this record in the CCP database. Since changes to the record must go through the DBMS to become effective, no changes or downloads can take place without access to the database, which creates an audit record.

Configuration Rules

Configuration rules are used by the CCP Import Configuration and CCP Client Programs to identify the SKU Components required for the assembled unit. The configuration process is driven from a description of each base model called a PRODUCT BOM.

The Product Bill-of-Materials contains two types of objects. The first is the TAG. The TAG object describes a software deliverable or a Compaq hardware option.

The software deliverable can be a language version of an operating system, an application, or an operating system driver. Each TAG references an actual software part number. Several TAGs may reference the same software part number.

The TAG is used in the Product BOM instead of the actual part number to simplify maintenance operations. A TAG may be used in any number of Product BOMs, but if the software part number changes for the TAG, then only the association between the TAG and part number need change.

The second type of object found in the Product BOM is rules. Rules are used to show dependencies between two TAGs, whether they are software or hardware. Rules determine the actual list of software part numbers that are produced from the software selection process.

The rules are evaluated to create a list of software part numbers. The software download tools need the software part numbers as keys to the PRISM database. Each software part number references a single SKU Component that must be copied to the assembled unit hard drive.

Explanation of Rules

Rules are a simple method for establishing dependencies between hardware and software Tags, or between two software Tags.

A Rule table is created for each Product BOM. The rules describe the software part numbers that should be used for each possible configuration of the Product BOM. The Rule table is composed of a line number, TAG-TYPE-ID, a rule condition, TAG-VALUE, a rule connector, and an output TAG-NAME. These were explained in the previous section.

The rule line number can be any number between 1 and 4 billion. It is best to define the rules in increments of ten or more so that new rules can be inserted without having to renumber all entries after the insertion.

The TAG-TYPE-ID field can be any of the following values:

| TAG TYPE ID | Description |
| --- | --- |
| BASE-MODEL | Model 0/1 Base Unit |
| MEMORY | Memory module. |
| HARD-DRIVE | Hard drive. |
| NETWORK | Network Interface Card. |
| AUDIO | Sound chip or card. |
| MODEM | Modem chip or card. |
| CD-ROM | CD-ROM drive. |
| VIDEO | Video chip or card. |
| OS | Operating System |
| OS DRIVER | Operating System Driver |
| APPLICATION | An application |
| CONFIGURATION | Software used to install, test, or configure the downloaded software. |
| HIDDEN APPLICATION | Application that should not be selectable through CCP Client or Import Configuration file. |
| ROM | Flash ROM code. |
| LANGUAGE | A language in the Compaq-Language table. |
| IMAGE | Reference to a catalogued image. |
| NO-OS | The model should not receive any user software. |
| END | Indicates the end of the rules |

A rule condition field contains the condition that must be TRUE to select the output TAG-NAME. The following are the valid tests that can be performed.

| Test | Description |
| --- | --- |
| ANY | If there are any TAG-VALUEs with a TAG-TYPE-ID then the test is TRUE. |
| EQUAL | If the value specified does match the TAG-TYPE-ID value, then select the part number from the output TAG-NAME. |
| NOT EQUAL | If the value specified does not match the TAG-TYPE-ID value, then select the part number from the output TAG-NAME. |
| NOT ANY | If there are any TAG-VALUEs with a TAG-TYPE-ID then the test is FALSE. If no TAGs exist, then the test is TRUE. |
| EXIST | The TAG-TYPE-ID condition exists. |
| NOT EXIST | The TAG-TYPE-ID condition does not exists. |

The rule connector field links multiple lines of a rule together. This is useful for If . . . Then AND If . . . Then types of tests.

A grouping connector is also available to group a series of actions under a single test. For example, if the operating system selected is Windows 95, then there may be a list of software that should also be installed.

| Connector | Description |
| --- | --- |
| AND | The current and the next rule are evaluated. Both must be TRUE for the rule to evaluate to TRUE. |
| OR | The current and the next rule are evaluated. Either one can be TRUE for the rule to evaluate to TRUE. |
| B_BLOCK | All of the rules that follow are under the control of the current rule. |
| E_BLOCK | Terminates the current block evaluation. |

TAG-VALUE

Normally, the TAG-VALUE is the name of a TAG, but there are two special cases where values in an external table may be used. These are language version and operating system. The valid selections for each of these are contained in the COMPAQ-LANGUAGE and COMPAQ-OS tables, respectively.

The COMPAQ-LANGUAGE-CODE is used from the COMPAQ-LANGUAGE table to test which language was selected for the configuration.

The COMPAQ-OS-CODE is used from the COMPAQ-OS table.

Output TAG-NAME

The last field in the Rules table is the output TAG-NAME. A software part number is associated with every TAG. If the rule evaluates to TRUE, the TAG table is accessed and the software part number that is associated with the TAG is selected for download.

In order for an image to be downloaded, a TAG must be defined in the TAG table. This TAG should have a TAG-TYPE-ID of IMAGE. When the rules are evaluated and this TAG is selected, the software part number for the TAG is replaced by the image identifier for the configuration.

Sample Rules

| Line # | TAG-TYPE-ID | RULE-CONDITION | TAG-VALUE | RULE CONNECTOR | OUTPUT-TAG-NAME |
|---|---|---|---|---|---|
| 10 | HARD- | ANY | | AND | |
| 20 | IMAGE | NOT | | B_BLOCK | |
| 30 | | | | | MSC FAT16 DOS7.0 1.2G Prima- |
| 40 | | | | | PC Diagnostics V10.15C |
| 50 | | | | | Compaq Installation Assistant |
| 60 | | | | E_BLOCK | |
| 70 | | | | | |
| 80 | LANGUA | EQUAL | US | AND | |
| 90 | IMAGE | NOT | | | F10 Setup V.170A English |
| 100 | | | | | |
| 110 | OS | EQUAL | WINDOWS | AND | |
| 120 | LANGUA | EQUAL | US | B_BLOCK | |
| 130 | | | | | A4NTOOL 1.01A7 |
| 140 | | | | | Config-To-Order (CTO) WINNT |
| 150 | | | | | Diags For Windows NT V1.08 |
| 160 | | | | | DM341 (Desktop Management) |
| 170 | | | | | Internet Explorer 3.02 English |
| 180 | | | | | Netflex-3 NDIS 4.08B NT |
| 190 | | | | | NT Service Pack 3 (SP3) |
| 200 | | | | | S3 V2 Driver For Windows NT |
| 210 | | | | | Safety & Comfort Guide For Win |
| 220 | | | | | Seagate Smart Client 1.00B Eng- |
| 230 | | | | | Windows NT 4.0 SR1 English |
| 240 | | | | | WNT4CFG 1.01 A8 |
| 250 | | | | E_BLOCK | |
| 260 | | | | | |
| 270 | OS | EQUAL | WINDOWS | AND | |
| 280 | LANGUA | EQUAL | US | AND | |
| 290 | AUDIO | EQUAL | CCP Audio | B_BLOCK | |
| 300 | | | | | ESS 1868 For Windows NT V2.00 |
| 310 | | | | E_BLOCK | |
| 320 | | | | | |
| 330 | OS | EQUAL | WINDOWS | AND | |
| 340 | LANGUA | EQUAL | US | AND | |
| 350 | CDROM | ANY | | B_BLOCK | |
| 360 | | | | | CPQATAPI V2.21A English |
| 370 | | | | E_BLOCK | |
| 380 | | | | | |
| 390 | OS | EQUAL | WINDOWS | AND | |
| 400 | LANGUA | EQUAL | US | B_BLOCK | |
| 410 | | | | | Config-To-Order (CTO) WIN95 |
| 420 | | | | | DCM 95 (Desktop Configuration |
| 430 | | | | | Diags for Windows 95 1.17A |
| 440 | | | | | DM340 (Desktop Management) |
| 450 | | | | | MS Windows 95 OPK v 4.00.1111 |
| 460 | | | | | Netflex-3 NDIS 4.08B W95 |
| 470 | | | | | Safety & Comfort Guide W95 |
| 480 | | | | | W95 A4CTO TL V1.01A |
| 490 | | | | | W95 S3 VIRGE/GX VIDEO |
| 500 | | | | | WIN4CFG V1.15A |
| 510 | | | | E_BLOCK | |
| 520 | | | | | |
| 530 | OS | EQUAL | WINDOWS | AND | |
| 540 | LANGUA | EQUAL | US | AND | |
| 550 | AUDIO | EQUAL | CCP Audio | B_BLOCK | |
| 560 | | | | | WIN95 ESS 1868 4.04A |
| 570 | | | | | SOUND ADD-ON WIN95 OSR2 |
| 580 | | | | E_BLOCK | |
| 590 | END | | | | |

Import Configuration Rules

Characters strings may not have single quotes. Example: Incorrect=Joe Bob's. Correct=Joe Bobs.

When defining a configuration, the SHIPPED token can not be used.

When "shipping" a configuration, only the MOD1SN and SHIPPED tokens can be in the file.

There must be a MOD1SN specified with the unit serial number. Record identifiers and parameters in the import configuration file are separated by commas.

Parameter information in the import configuration file may not contain commas.

File Format for Configuration Import File

This section describes the format of the import file for creating a system configuration. The following data are required for each configuration. The import file is named with an extension of ".IMP". Processed files have the extension changed to ".PRC".

| Name | Description |
|---|---|
| Base Model Serial Number | Serial number from the base model chassis used to build the system. |
| Compaq Sub-assembly Part Number | Part number for a sub-assembly added to the configuration. |
| Compaq Sub-assembly Serial Number | Serial number for a sub-assembly added to the configuration. |
| Product Id for MS Operating System | The COA number for the Microsoft Operating System. |
| Regional Setting | Preferred regional setting for the configuration |
| User name | Name of the end-user |
| User company name | Compaq name for the end-user |
| Operating System | Operating system selection for the configuration |
| Language version | Language version of the software |
| <application name> | Name of a Compaq-supplied application. |
| Non-Compaq Sub-assembly UPC Number | Universal Product Code for the Non-Compaq sub-assembly (hardware option). |
| Non-Compaq Sub-assembly Serial Number | Serial number for the non-Compaq sub-assembly. |
| Non-Compaq Sub-assembly Description | Freeform description for the non-Compaq sub-assembly. |
| Non-Compaq Sub-assembly Manufacturer Name | The name of the manufacturer for the product. |
| Non-Compaq Software UPC Number | Universal Product Code for the Non-Compaq Software |
| Non-Compaq Software Serial Number | Universal Product Code for the Non-Compaq Software Serial Number. |
| Non-Compaq Software Description | Universal Product Code for the Non-Compaq Software Description. |
| Non-Compaq Software Manufacturer Name | The name of the manufacturer for the product. |

File Record Format

The CPQSW and CPQAPPL can not be used with IMAGE. The SHIP cannot be done at the same time the configuration is defined. It must be performed at a later time after the software download is complete.

The fields in this file are comma delimited. If a field contains a comma, it needs to be enclosed in double-quotes.

| Record Identifier | Description | Number allowed |
|---|---|---|
| MOD1SN | Base Model serial number. | 1 |
| CPQHW | Compaq hardware record | >=1 |
| IMAGE | Name of a catalogued image | =1 |
| CPQSW | Compaq language-operating system record. | >=1 |
| CPQAPPL | Compaq application record | >=0 |
| PID | Microsoft operating system product identifier | 1 |
| UREG | User registration information record | 0 or 1 |
| 3RDHW | Third-part hardware information record | 0 or 1 |
| 3RDSW | Third-party software information record | 0 or 1 |
| SHIP | Unit shipped record | 0 or 1 |
| DOA | Unit is inoperable. | 0 or 1 |
| REPAIR | Repair a DOA unit | 0 or 1 |
| RECEIVE | Receive a unit that was shipped. | 0 or 1 |

This section describes the format of each record in the import file.

| Record Identifier | Field 1 | Field 2 | Field 3 | Field 3 |
|---|---|---|---|---|
| MOD1SN | UNIT SERIAL NUMBER | | | |
| CPQHW | OPTION PART NUMBER | OPTION SERIAL NUMBER | | |
| CPQSW | LANGUAGE VERSION | OPERATING SYSTEM | | |
| IMAGE | IMAGE IDENTIFIER | | | |
| CPQAPPL | APPLICATION NAME | | | |
| PID | COA NUMBER | | | |
| UREG | REGIONAL SETTING | USER NAME | COMPANY NAME | |
| 3RDHW | NC UPC NUMBER | NC OPTION SERIAL NUMBER | NC OPTION DESCRIPTION | NC OPTION MFG. NAME |
| 3RDSW | NC UPC NUMBER | NC OPTION SERIAL NUMBER | NC OPTION DESCRIPTION | NC OPTION MFG. NAME |
| SHIP | DATETIME | | | |
| DOA | | | | |
| REPAIR | | | | |
| RECEIVE | | | | |

Field Sizes

The following table contains the field sizes for each parameter entry in the configuration import file.

| Field | Description | Size |
|---|---|---|
| UNIT SERIAL NUMBER | The serial number from the base model chassis. | 12 |
| OPTION PART NUMBER | The Compaq option part number. | 10 |
| OPTION SERIAL NUMBER | The Compaq option serial number. | |
| IMAGE IDENTIFIER | The image identifier for the image. Use the CCP Client program to get this value. | 10 |
| LANGUAGE VERSION | The language version of the software required. These values can be retrieved from the CCP Client program. | 2 |
| OPERATING SYSTEM | The operating system version required. These values can be retrieved from the CCP Client program. | 15 |
| APPLICATION NAME | The valid names for each product model can be retrieved from the CCP Client program. | <=60 |
| COA NUMBER | The operating system Certificate of Authenticity number for this configuration. | 24 |
| REGIONAL SETTING | The preferred regional setting for the configured unit. These values can be retrieved from the CCP Client program. | <=18 |
| USER NAME | The name of the end-user. | <=50 |
| COMPANY NAME | The name of the end-user's company. | <=50 |

-continued

| Field | Description | Size |
|---|---|---|
| DATE-TIME | The date and time the unit shipped. Specified in MM/DD/YY HH:MM:SS. | <=30 |
| NC UPC NUMBER | The Universal Product Code for the Non-Compaq hardware or software option. | <=12 |
| NC OPTION SERIAL NUMBER | The serial number for the Non-Compaq hardware or software option. | <=30 |
| NC OPTION DE-SCRIPTION | The description of the Non-Compaq hardware or software option. | <=60 |
| NC OPTION MFG. NAME | The manufacturers name for the Non-Compaq hardware or software option. | <=40 |

Software Component and Diagnostic Pre-Installation Download Program

Figure 2:
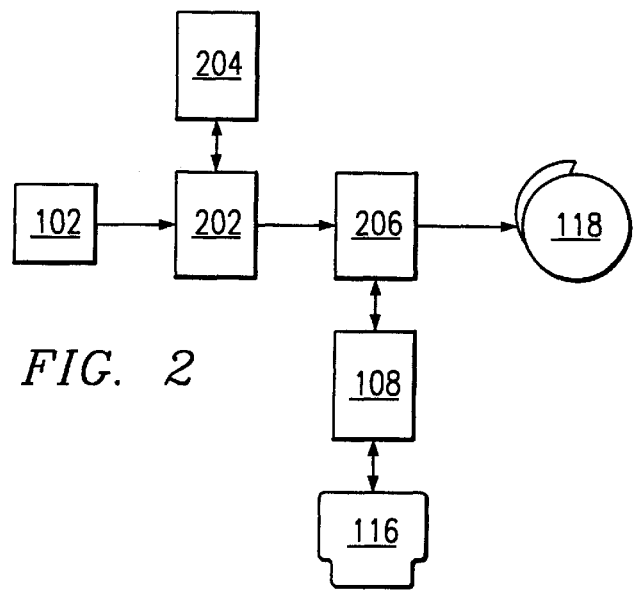
FIG. 2 depicts the a block diagram of the data flow of the software downloading process.
Figure 10:
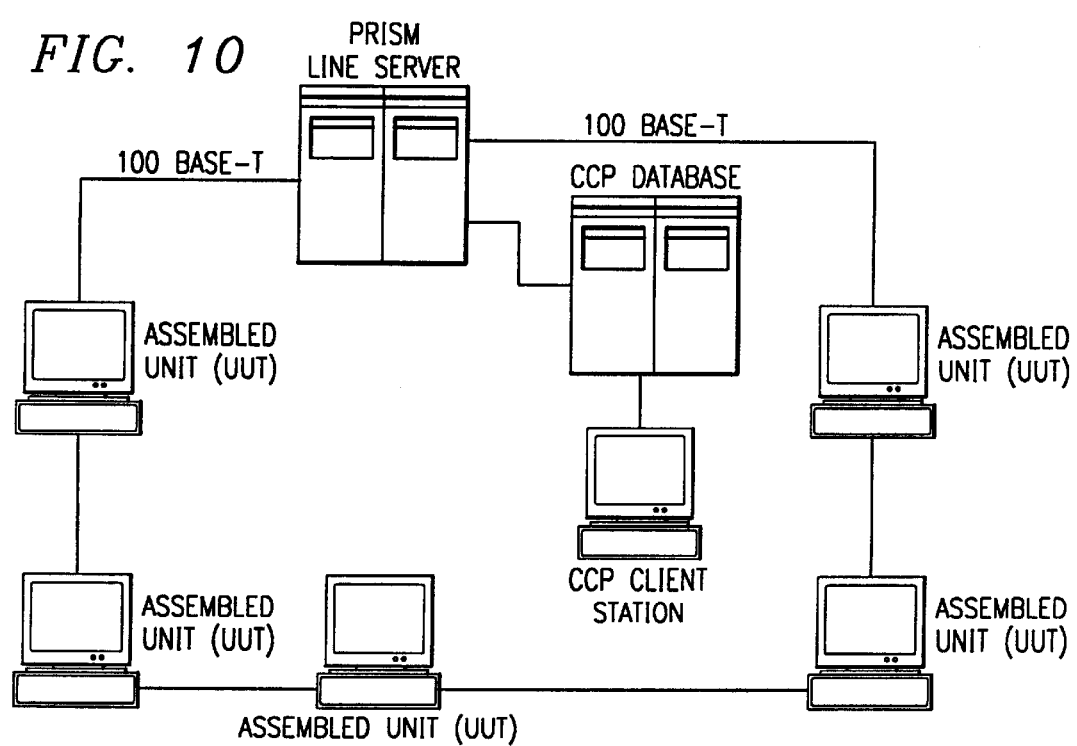
FIG. 10 shows a block diagram of the system architecture of a two-stage build installation process.
Figure 11:
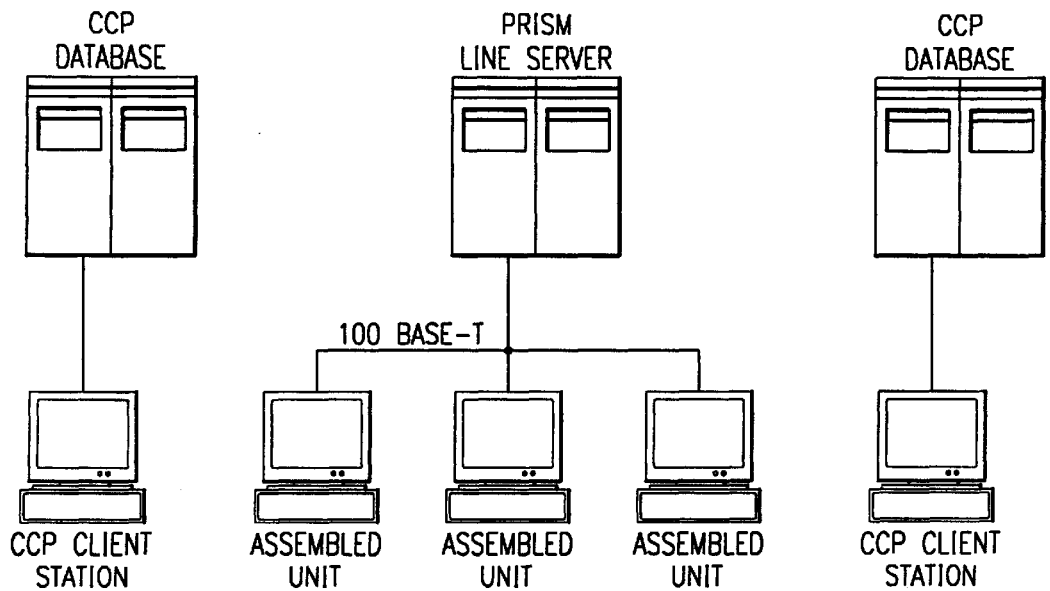
FIG. 11 shows a block diagram of the system architecture of a cell build installation process.
Figure 13:
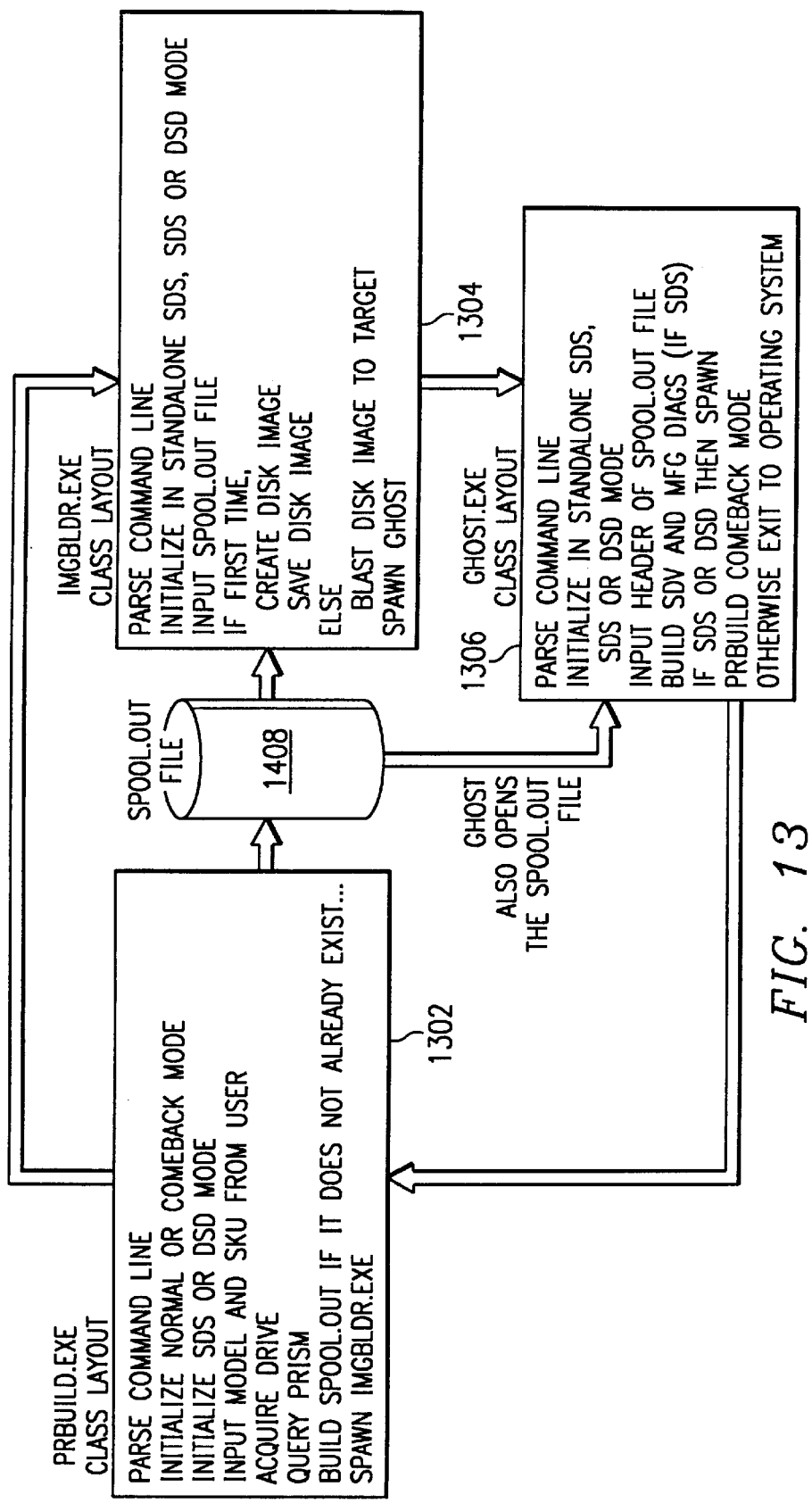
FIG. 13 shows a flow chart of the software download process.

FIG. 2 depicts the a block diagram of the data flow of the software downloading process. This figure is more fully described in Ser. No. 09/070,603, filed simultaneously herewith. FIGS. 8A–F depict a flow diagram of the CCP Client Program. This figure is more fully described in Ser. No. 09/070,589, filed simultaneously herewith. FIGS. 10 and 11 show block diagrams of the system architecture of the two-stage build and cell build installation processes, respectively. This figure is more fully described in Ser. No. 09/070,589, filed simultaneously herewith. The download process is initiated by the machine on which software will be installed. The download tool utilized in the preferred embodiment is referred to as GEMINI. FIG. 13 shows a flow chart of the software download process. This figure is more fully described in Ser. No. 09/070,603, filed simultaneously herewith.

The download process is split into three separate functions: 1) obtain a SKU and create a BOM list; 2) Build a drive with the proper components and partitions based on the BOM list; and 3) Build ghost partitions in which software download verification and manufacturing diagnostic processes can be run.

PRBUILD: this process makes a 'packing' list of what files are needed for the given SKU as well as other global information about the drive such as file system type, boot file specs, etc. Once this list is made, PRBUILD spawns the next module: IMGBLDR.

IMGBLDR: this process takes as its input the packing list that was the output of PRBUILD and builds a drive with any combination of FAT16/FAT32 partitions. Once the drive is built, IMGBLDR spawns the next module: GHOST.

GHOST: this process takes as its input the packing list that was the output of PRBUILD as well as information about the end of data on the drive provided by IMGBLDR 1404 and builds ghost partitions on the drive.

The above process is capable of installing software for both CTO and BTO builds. FIG. 14 shows a CTO build consisting of four SKU Components. FIG. 15 illustrates standard BTF/BTO SKUs and BTF/BTO SKUs that consist of multiple SKU Components. These figures are more fully described in Ser. No. 09/070,603, filed simultaneously herewith.

Diagnostics and Set-up Routines
  Diagnostics
  Verify Diskette

This program is used to verify the integrity of a CCP Software Download diskette by generating a digital signature for each file on the diskette. A corresponding function in the program examines each file on the diskette and compares the original signature to the current value.

The Verify Diskette program was developed to replace the current virus scan technology. This was necessary because the CCP Software Download diskette was too small to contain all the required programs plus the virus scan programs and data files. In addition, there were licensing issues with distributing a virus scan program on every diskette at the CCP sites.

This program can be logically divided into generation and verification functionality. The generation function is used to create a text file that contains signature entries for each file on the diskette, as well as an entry for the diskette partition boot record. The verification function is used at diskette boot time to compute the digital signature for each file and compare that value to the corresponding entry in the check file created during the generation phase. Any miscompare will force the display of an error message and the termination of the program.

When the program is running as a child process on the CCP Software download diskette, the programs error message display is blocked, and a specific error code is returned to the parent program. The error code forces the display of a generic error message.

The generation phase can be separated into three phases: partition boot record (PBR), diskette files, and check file.

The partition boot record on the target diskette is read at sector 0, cylinder 1, head 0. All 512 bytes are read into an internal buffer. If the last two bytes are not 0xaa55, the record is not considered a valid PBR and an error is displayed.

The signature value in the last sector of the diskette is set to zero. This area will be used to store the check file 32-bit CRC later.

The computed value for the PBR is written to the check file as "~PBR, <check value>."

Next, each file on the diskette, starting the root directory specified by the command line parameter is read, and a 32-bit CRC is created. An entry is appended to the check file in the following format: <filename>, <check value>.

Finally, the 32-bit CRC for the check file is computed. As discussed above, this value is stored in the last sector on the diskette.

A 32-bit CRC is computed for the check file specified on the command line. This value is compared to the check value stored in the last sector of the diskette. If the values are not the same, an error is displayed and the program terminates.

The check file is opened and each line is read. The file described in the line is opened and a 32-bit CRC is generated for the file. This value is compared to the value in the check file, and if it is different, an error is displayed and the program is terminated.

By default all files are checked against their CRC values in the CHKFILE.TXT. One possible exception is the CCPC-MD.INI file. If the CCPCMD.INI file contains the line COMPAQ-DEBUG, then the CRC checking for this file is bypassed. This is a feature that allows the Compaq test organizations to modify the CCPCMD.INI during test scenarios without encountering the verification error. Additional information about this feature is contained in the CCP Software Download Diskette specification.

If the diskette contains no miscompares, the program will exit with a zero return code.

Revolution Diagnostics

The diagnostic files will reside on the PRISM line server as they do in the Compaq factory today. Different versions may exist at the same time on the server, each version contained in its own sub-directory. The DIAG.MAP file may point to more than one sub-directory for a given configuration code. This file exists at a fixed location on the server and the PRISM download tools will read this file to determine the sub-directory (version of diagnostics) to copy to the UUT.

The distribution of the diagnostic files will be done over the same physical connection as other PRISM server files, but the exact process for moving these files is not defined at this time.

The System Component File (SCF) is created by the PN_XLATE process based on the settings in the PN_XLATE.INI file that is included in each diagnostics release. This file maps the hardware part numbers to a corresponding SCF, which describes the characteristics of a hardware sub-assembly that is tested by Revolution diagnostics.

The hardware part numbers are passed to the PRISM download tool through a SFDM interface that is similar to the SFDM system in use at Compaq factories. The download tool will query this interface with the production order number (for CCP, this is the UUT's serial number) and a list of part numbers and their quantities are returned.

The PRISM download tool will write the part number and quantities to the CTOHW.TXT file. Each line will contain a part number, a comma, and the quantity installed. This file is written to the root of the "ghost" partition, and in the primary partition in the \SYSTEM.SAV directory.

When diagnostics executes, it will read the CTOHW.TXT file and do the translations through the PN_XLATE.INI file. The translated output is recorded in a single SCF.

Figure 16A:
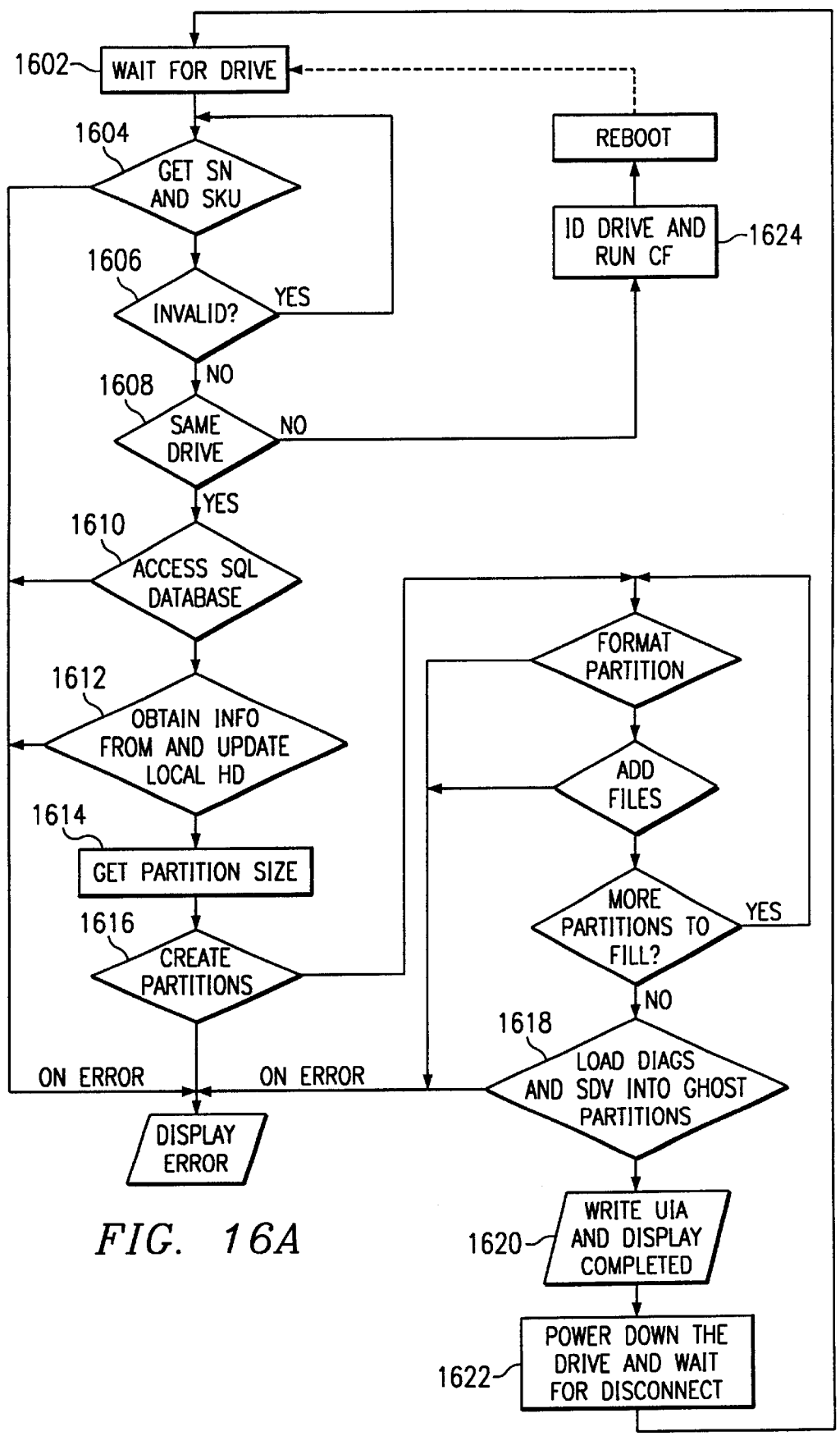
FIGS. 16A–B illustrate in flowchart form the software download process for direct and surrogate downloads respectively.
Figure 16B:
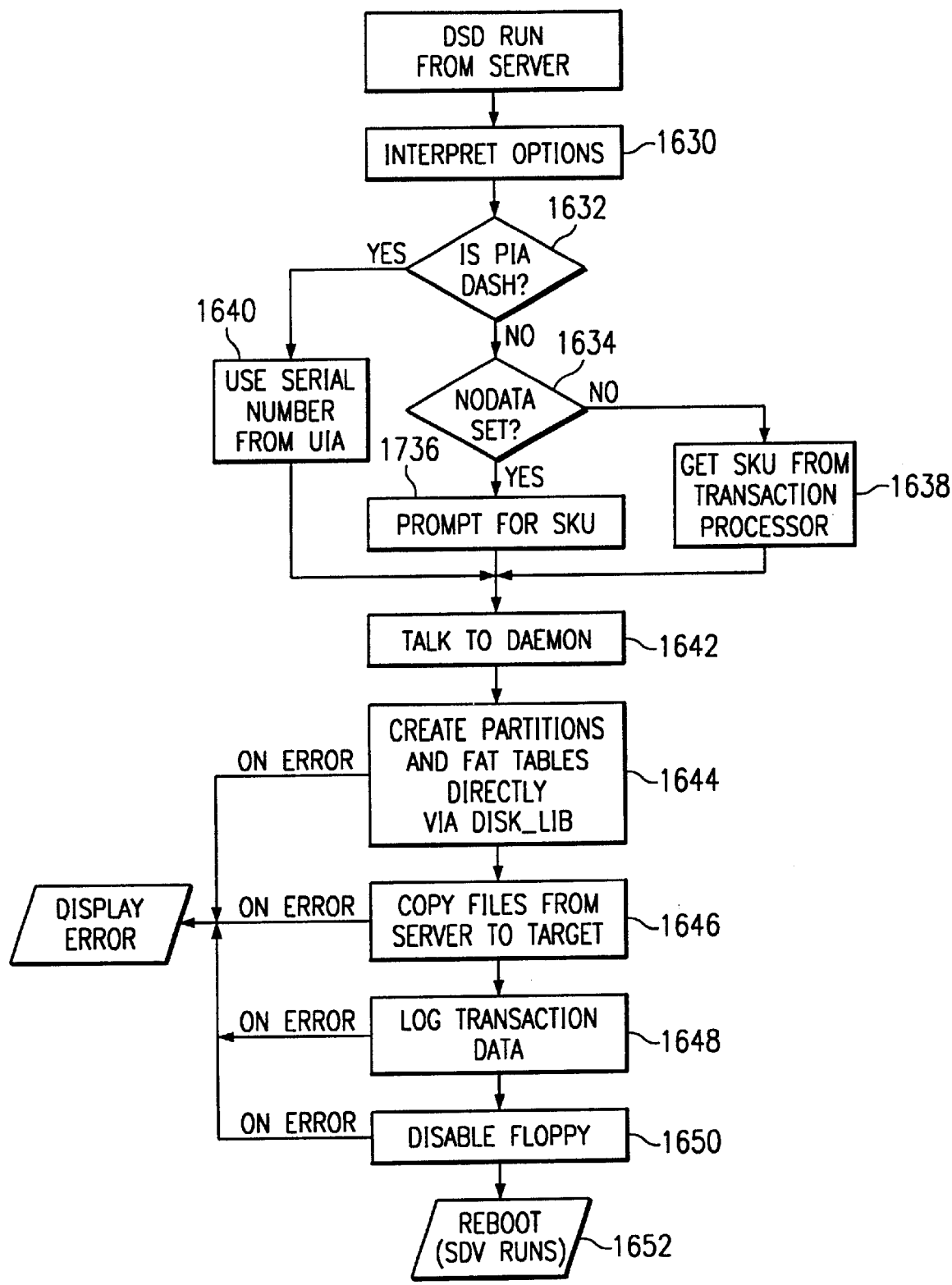

Software Download Verification SQL Software Download Verification confirms that data downloaded to the hard drive during the installation process is valid and error-free. SQLSDV uses a file containing checksum values for all the BOM files downloaded in either the surrogate or direct downloading process to verify their accuracy. FIGS. 16A–B illustrate in flowchart form the software download process for direct and surrogate downloads respectively. This figure is more fully described in Ser. No. 09/070,603, filed simultaneously herewith. SQLSDV also sets the data and time of the internal clock of the machine. Further, SQLSDV can interface with a variety of factory monitoring systems which perform separate diagnostic tests. Prior to running SQLSDV, the AUTOEXEC.BAT file checks for viruses. If a virus is detected, a flag file is written to the SDV partition. If this file exists SDV will exit with a red error screen.

When SQLSDV executes, it first obtains system parameters to display and control the process flow at a later time in the program. Also, the drive parameters (Heads, Cylinders, Sectors) of the machine being verified are obtained. Next, SQLSDV determines if one of two process (Run-in Status Monitor (RSM) or DART status) is running on a server connected to the network. RSM and DART are quality control systems which run in the factory. Both RSM and DART provide information on the current state of machines in the download process. The system's Serial Number is then read from CMOS and validated.

Next, SQLSDV determines if the machine is an EISA or ISA machine, and if it is Setup supported by the system. If the machine is an EISA machine or if Setup is supported then the system partition needs to be prepared and the appropriate configuration application run. To do this SQLSDV performs the following tasks: Make the system partition hidden so the FIO setup function will work. This is done by modifying the system partition table. The system partition table is structured as follows:

| Offset from start of sector | Size (bytes) Description |
|---|---|
| 0x001 | Boot indicator |
| 0x011 | Beginning Head |
| 0x021 | Beginning Sector |
| 0x031 | Beginning Cylinder |
| 0x041 | System Indicator |
| 0x051 | Ending Head |
| 0x061 | Ending Cylinder |
| 0x071 | Ending Sector |
| 0x084 | Starting Sector (relative to beginning of disk) |
| 0x0C4 | Number of sectors in partition |

Clear archive bits from all files in the system partition. This is required for the partition to boot properly.

Label the system partition with the volume label "DIAGS".

This is required so that the ROM can validate that the partition is a valid F10 system partition.

If D:\SAFESTRT\PLACE.COM exists run PLACE.COM/f to set up Safestart.

If the machine is an EISA machine run CF/f to configure the system. Otherwise the machine is an ISA machine. Attempt to execute Int 15 Function 0xE841 (Set CMOS defaults). If this function fails (CF set) run SETUPB to configure the system.

Run SERDRV.COM to setup the system to light up LEDs if an RSM is connected. If an RSM is not connected unload SERDRV by executing it again with a command line option telling it to unload, and run DARTSER.COM to determine if DART is connected. If DART is not connected, run DARTSER.COM again to tell it to unload.

C:\CRCFILE.BOM contains a list of all data areas that were downloaded with their full path and MD5 value. This is used for ALL partitions, including the system partition. The CRCFILE.BOM file is opened and each line is read to obtain the path for each data area on the disk to be checked. Each data area's MD5 value is calculated and verified against the MD5 value contained in the CRCFILE.BOM file. If a file's MD5 value in CRCFILE.BOM does not match the calculated MD5 value a red screen is displayed and SQLSDV exits.

The hard drive is scanned to verify that the FAT Table is intact with no cross-linked files and no lost clusters.

The CRC value of the FAT Table is then calculated and stored in the file C:\SYSTEM.SAV\CPQCRC.DAT for future use. If the FAT table CRC matches what is stored in this file it is determined that a unit has been used. This prevents the sale of used units as new.

Set the date and time.

Finally, if the unit was downloaded in surrogate mode the floppy is checked for a file called FLOPPY.BOO. If it exists it is overlayed over the floppy disks boot sector to prevent inadvertent boots to the hard drive.

Post-Download Verification

Once diagnostic routines have verified that the software was downloaded and the machine is functioning correctly, a series of routines verifies that the software components have been placed in the proper locations. Since a particular machine can have a wide variety of configurations, it is important to ensure that each file for each software component is in its proper place. This eliminates any missing or corrupted files due to file overwrite during the software download process.

Figure 12:
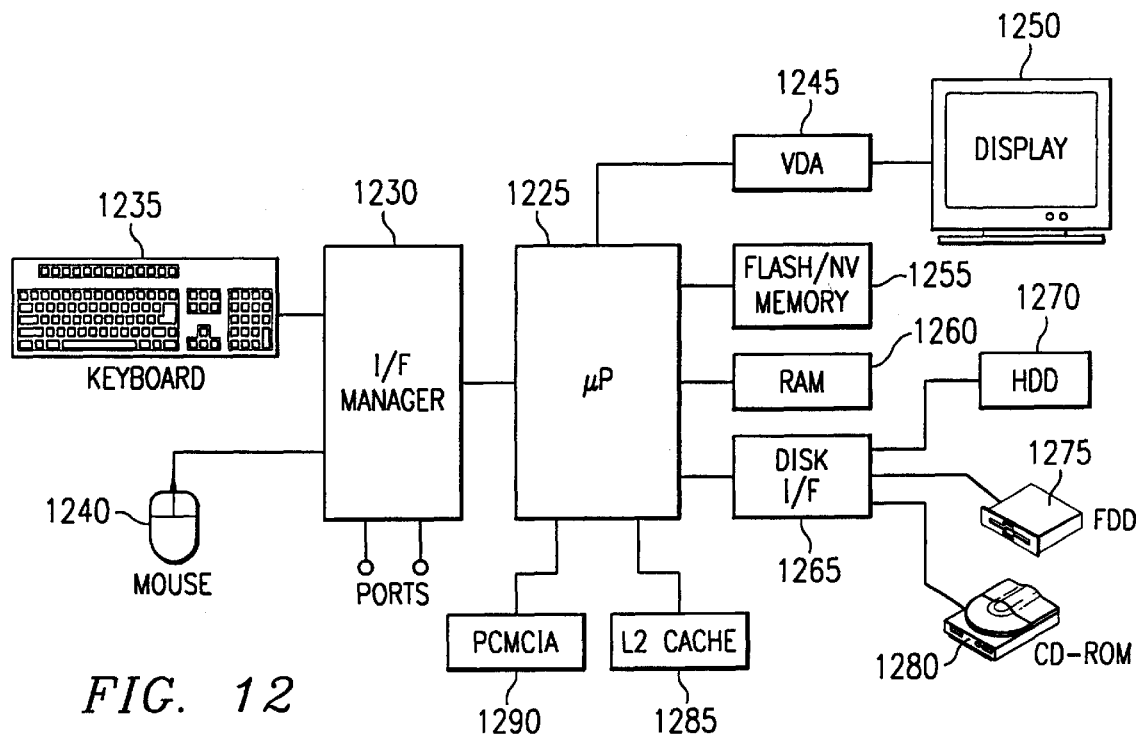
FIG. 12 shows a block diagram of a personal computer which can be manufactured using the innovations described in this application.

FIG. 12 shows a personal computer which can use the innovative software distribution system. The complete personal computer system, includes in this example:

user input devices (e.g. keyboard 1235 and mouse 1240);

at least one microprocessor 1225 which is operatively connected to receive inputs from said input device, through an interface manager chip 1230 (which also provides an interface to the various ports);

a memory (e.g. flash or non-volatile memory 1255 and RAM 1260), which is accessible by the microprocessor;

a data output device (e.g. display 1250 and video display adapter card 1245) which is connected to output data generated by the microprocessor 1225; and a magnetic disk drive 1270 which is read-write accessible, through an interface unit 1265, by the microprocessor 1225;

Optionally, of course, many other components can be included, and this configuration is not definitive by any means. For example, the personal computer may also include a CD-ROM drive 1280 and floppy disk drive ("FDD") 1275 which may interface to the disk interface controller 1265. Additionally, L2 cache 1285 may be added to speed data access from the disk drives to the microprocessor, and a PCMCIA 1290 slot accommodates peripheral enhancements.

Further details of the system context and of options for implementation may be found in MICROSOFT SQL SERVER ADMINISTRATOR'S COMPANION, Ramez Elmasri & Shamkant Navathe, FUNDAMENTALS OF DATABASE SYSTEMS (1989); Martin Gruber, SQL INSTANT REFERENCE (1993); and James L. Johnson, DATABASE MODELS, LANGUAGES, DESIGN (1997); all of which are hereby incorporated by reference.

According to a disclosed class of innovative embodiments, there is provided: a process for manufacturing computer systems with pre-installed software, comprising the steps of repeatedly: selecting a hardware and software configuration; storing a list corresponding to said configuration; assembling hardware components according to said list; translating said list using an automatic inference procedure into a list of software components to be down-loaded onto a computer system; and downloading software components from a software-loading-system according to said software component list, to create a predetermined software configuration on an assembled computer system.

According to another disclosed class of innovative embodiments, there is provided: a process for manufacturing computer systems with pre-installed software, comprising the steps of repeatedly: selecting a hardware and software configuration; storing a list corresponding to said configuration; assembling hardware components according to said list; storing unique identification numbers for each hardware component; storing a unique identification number for the operating system, if selected; translating said list using an automatic inference procedure into a list of software components to be downloaded onto a computer system; and downloading software components from a software-loading-system according to said software component list, to create a predetermined software configuration on an assembled computer system.

According to another disclosed class of innovative embodiments, there is provided: a process for manufacturing computer systems with pre-installed software, comprising the steps of repeatedly: creating a software configuration list by selecting software packages; translating said list using an automatic inference procedure; storing the result of step (b.), said result referencing all software components needed to satisfy installation of said software configuration list; and downloading software components from a software-loading-system into a computer system according to said result to create a predetermined software configuration on said computer system.

According to another disclosed class of innovative embodiments, there is provided: a process for manufacturing computer systems with pre-installed diagnostic and set-up software, comprising the steps of repeatedly: selecting a hardware and software configuration; storing a list corresponding to said configuration; assembling hardware components according to said list; creating an installation catalog for said system including software, software set-up, and software and hardware diagnostics from said list automatically using an automatic inference procedure; and downloading software components from a software-loading-system into a computer system according to said catalog, to create a customized self-test and software set-up environment on said system.

According to another disclosed class of innovative embodiments, there is provided: a system for manufacturing computer systems with pre-installed software, comprising: a stored hardware and software configuration list; a computer system assembled according to said list; a program which translates said list using an automatic inference procedure into a list of software components to be downloaded onto said computer system; and a software-loading-system which downloads said software components according to said software component list, to create a predetermined software configuration on said computer system.

According to another disclosed class of innovative embodiments, there is provided: a system for manufacturing computer systems with pre-installed diagnostic and set-up software, comprising: a stored hardware and software configuration list; a computer system assembled according to said list; a program which translates said list using an automatic inference procedure into an installation catalog for said computer system including software, software set-up, and software and hardware diagnostics; and a software-loading-system which downloads software components according to said installation catalog to create a customized self-test and software set-up environment on said computer system.

According to another disclosed class of innovative embodiments, there is provided: a database structure for managing a software selection rules base in a computer manufacturing environment, comprising: a first data association including a key uniquely identifying software or hardware part information contained in said database; a second data association including a key uniquely identifying model information contained in said database; a third data association including a key uniquely identifying software configuration rules contained in said database; a fourth data association including a key associating said part information to its appropriate rule; wherein a many-to-one relationship exist between said first and second data associations; wherein a many-to-one relationship exist between said fourth and first data associations; and wherein a many-to-many relationship exist between said third and fourth associations; wherein said first, second, third, and fourth associations define the rules base to be used in the selection of software, software set-up routines, and software and hardware diagnostics to be installed in computers in a manufacturing environment.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Several database models exist which utilize different approaches to the organization of data. While the preferred embodiment is implemented in a relational database model, alternatively, the object-oriented model, network model, or another model could be used to store and organize the data.

Additionally, a particular set of tables and data has been used for the organization of data in the relational database. However, data kept in one or more tables could be divided between other tables, used to populate new tables, or condensed into fewer tables or, a greater or lesser number of data attributes can be stored.

Further, different primary and/or secondary keys could be used to access the table.

In the preferred embodiment, the rules database is resides on a server with the PRISM database. However, the rules database could be stored on a server apart from the PRISM database.

For another example, in the preferred embodiment, the software component downloaded are chosen according to a rules database. However, other forms of decision making can be used. These may include neural networks and fuzzy logic.

In the preferred embodiment, distribution of database information takes place via LAN and WAN connections. However, the data could be distributed to local and remote facilities in many different ways such as over an intranet or the internet. Further, several different server/database configurations can be utilized. For example, a single server can maintain multiple isolated database structures and file sets.

In the preferred embodiment, the rules controlling software configurations are stored in a database, however, they could be stored in a flat file which configures an interpreting program, hard coded into a software application, or in some other form.

What is claimed is:

1. A process for manufacturing computer systems with pre-installed software, comprising the steps of repeatedly:
    (a.) selecting a hardware and software configuration;
    (b.) storing a list corresponding to said configuration;
    (c.) assembling hardware components according to said list;
    (d.) translating said list using an automatic inference procedure into a list of software components to be downloaded onto a computer system, wherein said automatic inference translating is performed according to a rules database separately stored from a software-loading-system; and
    (e.) downloading software components from the software-loading-system according to said software component list, to create a predetermined software configuration on an assembled computer system.

2. The process of claim 1, wherein said hardware configuration list is created by scanning hardware part numbers.

3. The process of claim 1, wherein said downloaded software components create a predetermined software configuration and also a self-test and software set-up environment on said system which is customized for the particular software configuration.

4. The process of claim 1, wherein tags are used by said inference procedure to associate said hardware and software selections with a set of rules.

5. The process of claim 1, wherein said software component list is dependent on said hardware configuration.

6. The process of claim 1, wherein said software component list is dependent on a language preference selection.

7. The process of claim 1, wherein said software component list is dependent on an operating system preference selection.

8. The process of claim 1, wherein said software component list includes diagnostic software.

9. The process of claim 1, wherein said software component list includes set-up routines which are dependent on said hardware and software configuration.

10. The process of claim 1, wherein said automatic procedure translates according to a set of rules stored in a database.

11. The process of claim 1, wherein said hardware configuration and said software component list are stored in a database.

12. The process of claim 1, wherein hardware and software configurations not provided by a manufacturer which are installed on said assembled computer system are stored in a database.

13. The process of claim 1, wherein said inference procedure translates said list by associating a language selection with software selections.

14. The process of claim 1, wherein said inference procedure translates said list by associating a hardware selection with software selections.

15. The process of claim 1, wherein said inference procedure translates said list by associating a software selection with software selections.

16. A process for manufacturing computer systems with pre-installed software, comprising the steps of repeatedly:
    (a.) selecting a hardware and software configuration;
    (b.) storing a list corresponding to said configuration;
    (c.) assembling hardware components according to said list;
    (d.) storing unique identification numbers for each hardware component;
    (e.) storing a unique identification number for the operating system, if selected;
    (f.) translating said list using an automatic inference procedure into a list of software components to be downloaded onto a computer system, wherein said automatic inference translating is accomplished according to a set of rules in a rules database stored separately from a software-downloading-system; and
    (g.) downloading software components from a software-loading-system according to said software component list, to create a predetermined software configuration on an assembled computer system.

17. The process of claim 16, wherein said hardware configuration list is created by scanning hardware part numbers.

18. The process of claim 16, wherein said downloaded software components create a predetermined software configuration and also a self-test and software set-up environment on said system which is customized for the particular software configuration.

19. The process of claim 16, wherein tags are used by said inference procedure to associate said hardware and software selections with a set of rules.

20. The process of claim 16, wherein said software component list is dependent on said hardware configuration.

21. The process of claim 16, wherein said software component list is dependent on a language preference selection.

22. The process of claim 16, wherein said software component list is dependent on an operating system preference selection.

23. The process of claim 16, wherein said software component list includes diagnostic software.

24. The process of claim 16, wherein said software component list includes set-up routines which are dependent on said hardware and software configuration.

25. The process of claim 16, wherein said inference procedure translates using a set of rules stored in a database.

26. The process of claim 16, wherein said hardware configuration and said software component list are stored in a database.

27. The process of claim 16, wherein hardware and software configurations not provided by a manufacturer which are installed on said assembled computer system are stored in a database.

28. The process of claim 16, wherein said inference procedure translates said list by associating a language selection with software selections.

29. The process of claim 16, wherein said inference procedure translates said list by associating a hardware selection with software selections.

30. The process of claim 16, wherein said inference procedure translates said list by associating a software selection with software selections.

31. A system for manufacturing computer systems with pre-installed software, comprising:
   (a.) a stored hardware and software configuration list;
   (b.) a computer system assembled according to said list;
   (c.) a program which translates said list using an automatic inference procedure into a list of software components to be downloaded onto said computer system, wherein said program translates said list using a set of rules stored separately from a software-loading-system; and
   (d.) said software-loading-system downloads said software components according to said software component list, to create a predetermined software configuration on said computer system.

32. The system of claim 31, further comprising:
   (a.) unique identification numbers for each hardware component; and
   (b.) a unique identification number for the operating system selected.

33. The system of claim 31, wherein said hardware configuration list is created by scanning hardware part numbers.

34. The system of claim 31, wherein said downloaded software components create a predetermined software configuration and also a self-test and software set-up environment on said system which is customized for the particular software configuration.

35. The system of claim 31, wherein tags are used by said inference procedure to associate said hardware and software configuration with a set of rules.

36. The system of claim 31, wherein said software component list is dependent on said hardware configuration.

37. The system of claim 31, wherein said software component list is dependent on a language preference selection.

38. The system of claim 31, wherein said software component list is dependent on an operating system preference selection.

39. The system of claim 31, wherein said software component list includes diagnostic software.

40. The system of claim 31, wherein said software component list includes set-up routines which are dependent on said hardware and software configuration.

41. The system of claim 31, further comprising a database to store set of rules used by said inference procedure to translate said list.

42. The system of claim 31, further comprising a database to store said hardware configuration and said software component list.

43. The system of claim 31, further comprising a database to store hardware and software configurations not provided by a manufacturer which are installed on said assembled computer system.

44. The system of claim 31, wherein said inference procedure translates said list by associating a language selection with software selections.

45. The system of claim 31, wherein said inference procedure translates said list by associating a hardware selection with software selections.

46. The system of claim 31, wherein said inference procedure translates said list by associating a software selection with software selections.

47. A database structure for managing a software selection rules base in a computer manufacturing environment, comprising:
   a first data association including a key uniquely identifying software or hardware part information contained in said database;
   a second data association including a key uniquely identifying model information contained in said database;
   a third data association including a key uniquely identifying software configuration rules contained in said database;
   a fourth data association including a key associating said part information to its appropriate rule;
   wherein a many-to-one relationship exist between said first and second data associations;
   wherein a many-to-one relationship exist between said fourth and first data associations; and
   wherein a many-to-many relationship exist between said third and fourth associations;
   wherein said first, second, third, and fourth associations define the rules base to be used in the selection of software, software set-up routines, and software and hardware diagnostics to be installed in computers in a manufacturing environment.

48. The database structure of claim 47, wherein each said data association is a data table in a relational database model.

* * * * *